United States Patent [19]
Taniguchi et al.

[11] Patent Number: 5,393,087
[45] Date of Patent: Feb. 28, 1995

[54] FLUID ACTIVE SUSPENSION APPARATUS AND OPERATION CONTROL METHOD THEREFOR

[75] Inventors: Yasutaka Taniguchi, Hoi; Takao Morita, Toyota; Tadao Tanaka, Okazaki; Kenji Hayase, Toyoake; Masanori Tani, Okazaki, all of Japan

[73] Assignee: Mitsubishi Jidosha Kogyo Kabushiki Kaisha, Tokyo, Japan

[21] Appl. No.: 122,299

[22] Filed: Sep. 17, 1993

[30] Foreign Application Priority Data

| Sep. 18, 1992 | [JP] | Japan | 4-249786 |
| Sep. 18, 1992 | [JP] | Japan | 4-249787 |
| Oct. 27, 1992 | [JP] | Japan | 4-288350 |
| Oct. 27, 1992 | [JP] | Japan | 4-288351 |

[51] Int. Cl.6 .............................. B60G 11/26
[52] U.S. Cl. .................. 280/707; 280/840; 364/424.05
[58] Field of Search .............. 280/707, 840; 364/424.05

[56] References Cited

U.S. PATENT DOCUMENTS 4,977,506 12/1990 Hara et al. ............... 280/707

FOREIGN PATENT DOCUMENTS

| 0187370 | 7/1986 | European Pat. Off. . |
| 0188289 | 7/1986 | European Pat. Off. . |
| 0217356 | 4/1987 | United Kingdom . |
| 2205285 | 12/1988 | United Kingdom . |
| 2205537 | 12/1988 | United Kingdom . |
| 2220176 | 1/1990 | United Kingdom . |

*Primary Examiner*—Kenneth R. Rice

[57] ABSTRACT

A pneumatic active suspension apparatus is provided wherein, when a sprung vertical acceleration (ZG), which causes a wafting phenomenon perceptible by a person in a vehicle, occurs during travel of the vehicle, supply/discharge of air to/from air spring chambers of suspension units is carried out for a supply/discharge control time determined based on the maximum value (ZGmax) of the sprung vertical acceleration. The supply/discharge control is started at an advanced time based on the sprung acceleration whose phase is advanced by 90 degrees from that of the sprung velocity, to thereby produce a force acting to cancel out the sprung vertical velocity at proper timing. As a result, the operation delay of the suspension apparatus is compensated for and the sprung vertical motion is suppressed.

21 Claims, 20 Drawing Sheets

F I G. 11
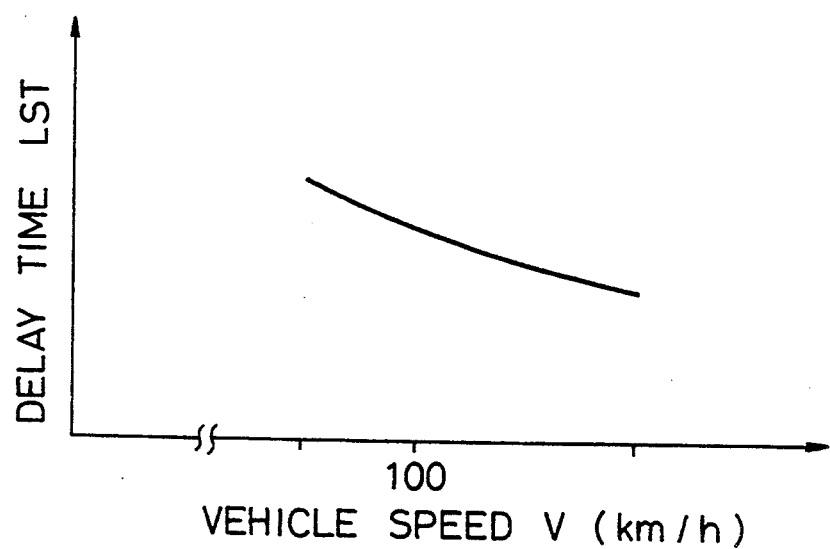

FLUID ACTIVE SUSPENSION APPARATUS AND OPERATION CONTROL METHOD THEREFOR

BACKGROUND OF THE INVENTION

The present invention relates to a fluid active suspension apparatus using compressible fluid as an operating medium and to an operation control method for the suspension apparatus.

In order to suppress vibrations of a vehicle body caused by vibration input from the road surface, it is known in the art to employ an active suspension apparatus in which positive damping is effected by supplying and discharging compressible fluid to and from fluid spring chambers. U.S. Pat. No. 4,856,815, for example, discloses a pneumatic suspension apparatus which is designed to keep the vehicle body horizontally positioned even when the vehicle is traveling on a wavy road. In this suspension apparatus, air is supplied to and discharged from air spring chambers of suspension units arranged between the vehicle body and respective wheels, in accordance with the output of a stroke sensor representing the relative displacement between the vehicle body and the wheels (more generally, between sprung and unsprung sides of the vehicle), to thereby control the stroke of the suspension units so that the sprung side can be held horizontally even when the unsprung side is making a vertical (up-and-down) motion in response to change in the level of the road surface.

More specifically, in this suspension apparatus, when the stroke sensor output becomes greater than or equal to a predetermined value, a supply valve is opened for a predetermined time to actively supply air to the air spring chamber if the air spring is expanding, and a discharge valve is opened for a predetermined time to actively discharge air from the air spring chamber if the air spring is contracting.

This type of suspension apparatuses can suppress vertical motion of the vehicle body, but is not sufficiently effective in reducing the force causing the vertical motion of the vehicle body itself. Thus, when sprung resonance conditions are fulfilled, in particular, bouncing vibration, which gives a strange feeling to a person in the vehicle, occurs in a sprung resonance region.

As a control technique for reducing such bouncing vibration, the skyhook damper theory is known in the art. According to this theory, a force proportional to the vertical velocity of the vehicle body is produced and is acted in a direction to cancel out the vertical velocity, to thereby suppress vibration of the vehicle body caused by the vibration transmitted from the road surface. So far, the skyhook damper theory is embodied in an active suspension apparatus using incompressible fluid as an operating medium.

For example, U.S. Pat. No. 5,089,966 discloses a hydraulic active suspension apparatus using oil as the operating medium. In this suspension apparatus, the vertical velocity of the vehicle body is obtained by detecting the vertical acceleration of the vehicle body and integrating the detected acceleration, and an oil pressure proportional to the vertical velocity is supplied to actuators, to thereby damp vibration of the vehicle body.

This type of hydraulic active suspension apparatuses comprises, as its indispensable elements, a hydraulic pressure source including a pump, a reservoir tank, and a pump accumulator for eliminating the pumping pulsation, a hydraulic control system including an actuator, a proportional control valve for applying a desired pressure of oil from the hydraulic pressure source to the actuator, and a main accumulator disposed between the proportional control valve and the actuator for accumulating the hydraulic pressure, and a controller for controlling the hydraulic control system.

This hydraulic active suspension apparatus is effective in carrying out damping based on the skyhook damper theory, but it requires a proportional control valve having high operation accuracy and high operation response, which leads to an increase of the cost. Further, since oil is used as the operating fluid, the hydraulic pressure source is large in size, requiring much space for the suspension apparatus and increasing the weight of the vehicle.

In the pneumatic active suspension apparatus, on the other hand, since air serving as the operating fluid has compressibility, it is difficult to control the internal pressure of the air spring chamber of the apparatus by using, e.g., a proportional control valve. Further, the pneumatic suspension apparatus is low in operation response, and it is, therefore, difficult to operate an actuator such as the air spring chamber at a proper time so as to produce a force for suppressing vibration of the vehicle body. For this reason, no skyhook damper theory-based control technique applicable to the pneumatic active suspension apparatus has been developed yet.

The aforementioned hydraulic active suspension apparatus capable of skyhook damper theory-based active control uses three or four sensors for detecting the vertical acceleration of the vehicle body, in order to acquire control information for use in the active control. The vertical acceleration sensors are, however, expensive, and an increase in the number of sensors generally requires more thoughtful consideration on the installation of sensors, correction of the sensor output characteristics in relation to temperature, configuration of a fail-safe system for troubleshooting the sensors, etc. Accordingly, the conventional apparatus using three or four vertical acceleration sensors is costly.

OBJECTS AND SUMMARY OF THE INVENTION

An object of the present invention is to provide a fluid active suspension apparatus and an operation control method therefor, which permit an active control based on the skyhook damper theory to be achieved even in the case where the operating fluid used is a compressible fluid.

Another object of the present invention is to provide a fluid active suspension apparatus and an operation control method therefor, which permit an active control based on the skyhook damper theory to be carried out at low cost, without using an expensive sensor system to generate control information.

According to one aspect of the present invention, there is provided a method of controlling operation of a fluid active suspension apparatus whose suspending characteristic is actively changed in accordance with supply and discharge of an operating fluid to and from a fluid actuator. This operation control method is characterized by comprising: presetting a plurality of supply/discharge control patterns; detecting a parameter related to a sprung vertical motion; selecting a required supply/discharge control pattern from among the supply/discharge control patterns in accordance with the magnitude of the detected sprung vertical motion-related parameter; and carrying out supply/discharge control of a compressible fluid as the operating fluid, in accordance with the selected supply/discharge control pattern.

Preferably, the sprung vertical motion-related parameter is a sprung vertical acceleration detected by a sprung vertical acceleration sensor arranged at a sprung side. Alternatively, the sprung vertical motion-related parameter may be control information having a phase close to that of a sprung vertical acceleration, the control information being obtained by performing a phase compensation process on a relative displacement velocity between sprung and unsprung sides which is obtained based on a relative displacement between the sprung and unsprung sides detected by a stroke sensor arranged between the sprung and unsprung sides.

According to another aspect of the present invention, an operation control method for a fluid active suspension apparatus is characterized by comprising: detecting a sprung vertical acceleration; and carrying out supply/discharge control of a compressible fluid as an operating fluid, in accordance with the detected sprung vertical acceleration.

According to still another aspect of the present invention, an operation control method for a fluid active suspension apparatus is characterized by comprising: detecting a relative displacement between sprung and unsprung sides; obtaining a relative displacement velocity between the sprung and unsprung sides based on the detected relative displacement; generating control information having a phase close to that of a sprung vertical acceleration, by subjecting the relative displacement velocity to a phase compensation process; and carrying out supply/discharge control of a compressible fluid as an operating fluid, in accordance with the control information.

Preferably, the phase of the relative displacement velocity is delayed or advanced by a predetermined phase angle in the phase compensation process.

In the three methods described above, preferably, the supply/discharge control of the compressible fluid is executed only when the frequency of the sprung vertical motion-related parameter, sprung vertical acceleration or control information falls within a predetermined frequency range including a sprung resonance frequency. In this case, the supply/discharge control is preferably started when the magnitude of the sprung vertical motion-related parameter, sprung vertical acceleration or control information has become greater than or equal to a first predetermined value, and is ended when the magnitude of the sprung vertical motion-related parameter, sprung vertical acceleration or control information has become smaller than a second predetermined value smaller than the first predetermined value after the start of the supply/discharge control.

Still preferably, the above three methods are applied to a fluid active suspension apparatus having fluid actuators arranged at front- and rear-wheel sides, respectively, and further comprise the step of detecting a vehicle speed, and the supply/discharge control of the compressible fluid with respect to the fluid actuators of the rear-wheel side is started when a delay time corresponding to the vehicle speed has elapsed from the start of the supply/discharge control of the compressible fluid with respect to the fluid actuators of the front-wheel side. The compressible fluid is preferably air.

According to another aspect of the present invention, there is provided a method of controlling operation of a fluid active suspension apparatus whose suspending characteristic is actively changed in accordance with supply and discharge of an operating fluid to and from a fluid actuator. This operation control method comprises the steps of: presetting a plurality of supply/discharge control patterns; detecting a parameter related to a sprung vertical motion; measuring a number of times supply/discharge control has been executed; selecting a required supply/discharge control pattern from among the supply/discharge control patterns in accordance with the magnitude of the detected sprung vertical motion-related parameter and the measured number of times supply/discharge control has been executed; and carrying out supply/discharge control of a compressible fluid as the operating fluid, in accordance with the selected supply/discharge control pattern.

According to a further aspect of the present invention, there is provided a fluid active suspension apparatus comprising: fluid actuators arranged between sprung and unsprung sides of a vehicle and associated with front- and rear-wheel sides of the vehicle, respectively; a supply source for supplying a compressible fluid; a supply valve arranged in a supply pipe connecting the fluid actuators and the supply source; a discharge valve arranged in a discharge pipe connected to the fluid actuators; detecting means for detecting a sprung vertical motion-related parameter and generating an output representing the detected parameter; and control means including memory means storing a plurality of supply/discharge control patterns. The control means selects a pattern suited to the output of the detecting means, from among the supply/discharge control patterns, and controls open/close operation of the supply valve and the discharge valve in accordance with the selected supply/discharge control pattern, to thereby control supply and discharge of the compressible fluid to and from the fluid actuators.

Preferably, the control means includes determination means for determining the frequency of the sprung vertical motion-related parameter, and carries out the supply/discharge control of the compressible fluid only when the frequency of the sprung vertical motion-related parameter falls within a predetermined frequency range including a sprung resonance frequency. Still preferably, the control means further includes second determination means for determining the magnitude of the sprung vertical motion-related parameter, and the control means starts the supply/discharge control when the magnitude of the sprung vertical motion-related parameter has become greater than or equal to a first predetermined parameter, and ends the supply/discharge control when the magnitude of the sprung vertical motion-related parameter has become smaller than a second predetermined value smaller than the first predetermined value after the start of the supply/discharge control.

The fluid active suspension apparatus preferably further includes a vehicle speed sensor for detecting a vehicle speed. The detecting means is a single sensor arranged at a front of a vehicle body which is part of the sprung side, and the control means further includes means for obtaining a delay time corresponding to the vehicle speed detected by the vehicle speed sensor, wherein the supply/discharge control of the compressible fluid with respect to the fluid actuators of the rear-wheel side is started when the delay time has elapsed from the start of the supply/discharge control of the compressible fluid with respect to the fluid actuators of the front-wheel side.

According to another aspect of the present invention, a fluid active suspension apparatus comprises: a fluid actuator arranged between sprung and unsprung sides of a vehicle; a supply source for supplying a compressible fluid; a supply valve arranged in a supply pipe connecting the fluid actuator and the supply source; a discharge valve arranged in a discharge pipe connected to the fluid actuator; detecting means for detecting a sprung vertical acceleration and generating an output representing the detected sprung vertical acceleration; and control means for controlling open/close operation of the supply valve and the discharge valve in accordance with the output of the detecting means, to thereby control supply and discharge of the compressible fluid to and from the fluid actuator.

The fluid active suspension apparatus and operation control method therefor according to the present invention are advantageous in that active control based on the skyhook damper theory can be achieved even in the case where the operating fluid used is a compressible fluid (e.g., air).

BRIEF DESCRIPTION OF THE DRAWINGS

FIG. 11 is a graph showing an example of a delay time map used for the riding quality control;

DETAILED DESCRIPTION OF THE INVENTION

A pneumatic active suspension system to which an operation control method according to a first embodiment of the present invention is applied will be described.

The suspension system is intended primarily to carry out riding quality control according to the present invention, which is based on the skyhook damper theory and designed to restrain the strange and uncomfortable feeling (hereinafter called "wafting phenomenon") that the driver receives as a result of vertical vibrations of the vehicle body (sprung side), in addition to height control and position (attitude) control of a four-wheel motor vehicle in which the suspension system is installed. To this end, the suspension system comprises four suspension units associated with the respective wheels of the motor vehicle, and an air circuit for supplying and discharging air to and from air spring chambers of the respective four suspension units, as in the suspension apparatus disclosed in U.S. Pat. No. 4,856,815, and controls the supply/discharge of air to/from the four air spring chambers independent of one another by opening/closing various valves arranged in the air circuit, to thereby change the internal-pressure of the individual air spring chambers to various different values. The suspension system is preferably provided with four vertical acceleration sensors for detecting, preferably in the vicinity of the four wheels, respectively, the vertical accelerations of the sprung side (vehicle body) as control information for use in the supply/discharge control.

Figure 1:
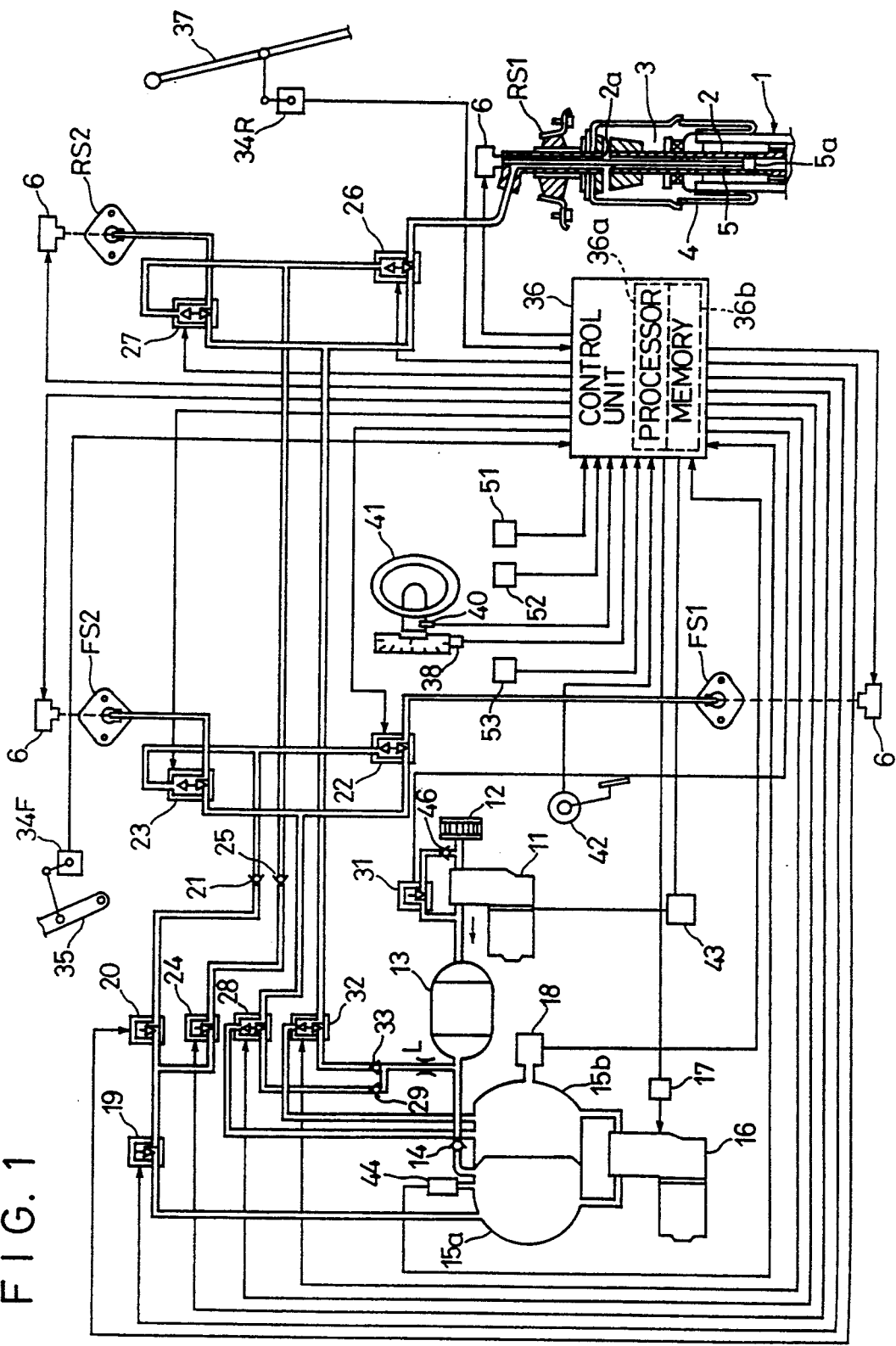
FIG. 1 is a diagram illustrating a principal part of a pneumatic suspension system to which a suspension operation control method according to a first embodiment of the present invention is applied.

More specifically, the suspension system comprises a control unit 36 including a processor 36a, a memory 36b, an input/output circuit, etc., as shown in FIG. 1. The control unit 36 has the function as a control section for the suspension system, as well as the function of controlling the operation of various operating parts of the motor vehicle, and carries out various control operations in parallel with one another in accordance with a control program stored in the memory 36b.

The suspension system includes suspension units FS1, FS2, RS1, and RS2 provided, respectively, for the front left wheel, front right wheel, rear left wheel, and rear right wheel of the motor vehicle. The four suspension units have an identical arrangement. In the following description, symbol S is used to denote the four suspension units collectively, and symbols FS1 to RS2 are used to denote the suspension units separately.

The suspension units S each comprise a shock absorber 1 of variable damping force type, arranged between the vehicle body and the corresponding wheel. The shock absorber 1 includes a cylinder attached to the wheel, and a piston rod 2 having a piston slidably fitted in the cylinder and coupled at upper end to the vehicle body. The damping force of the shock absorber 1 is controlled by operating a valve 5a by means of an actuator 6 through a control rod 5 fitted through the piston rod 2.

Each suspension unit S further comprises an air spring chamber 3 incorporated in the shock absorber 1. The air spring chamber 3 is located at an upper portion of the shock absorber 1 coaxially with the piston rod 2, and part thereof is defined by a bellows 4. The air spring chamber 3 is disposed for communication with the air circuit through a passage 2a formed in the piston rod 2, so that air can be supplied to and discharged from the air spring chamber 3.

The air circuit of the suspension system comprises a high-pressure reservoir tank 15a for supplying compressed air to the suspension units S, and a low-pressure reservoir tank 15b for introducing therein the air discharged from the suspension units S. Associated with the high-pressure reservoir tank 15a of the air circuit are a compressor 11 for compressing the air introduced through an air cleaner 12, a dryer 13 filled with a drying agent such as silica gel, and a check valve 14, whereby compressed, dried air is stored in the high-pressure reservoir tank 15a.

The air circuit further comprises a return pump 16 having suction and discharge sides thereof connected to the low- and high-pressure reservoir tanks 15b and 15a, respectively, a return pump relay 17 for supplying and cutting off power to the pump, and a low-pressure pressure switch 18 for detecting the internal pressure of the low-pressure reservoir tank 15b, so that the internal pressure of the low-pressure reservoir tank 15b may be maintained at a level lower than or equal to a first predetermined pressure (e.g., 0.6 kg per square centimeter). Specifically, when the internal pressure of the low-pressure reservoir tank 15b becomes higher than the first predetermined pressure, the pressure switch 18 turns on, and the return pump relay 17 also turns on in accordance with a control signal which is supplied from the control unit 36 in response the switch activation, to operate the return pump 16. When the pressure switch 18 turns off, operation of the pump 16 is stopped.

Further provided are a high-pressure pressure switch 44 for detecting the internal pressure of the high-pressure reservoir tank 15a, and a compressor relay 43 for supplying power to the compressor 11, so that the internal pressure of the high-pressure reservoir tank 15a may be maintained at a level higher than or equal to a second predetermined pressure (e.g., 9.5 kg per square centimeter). Specifically, when the internal pressure of the high-pressure reservoir tank 15a becomes lower than the second predetermined pressure, the pressure switch 44 turns on, and the compressor relay 43 also turns on in accordance with a control signal which is supplied from the control unit 36 in response to the switch activation, to thereby operate the compressor 11. When the pressure switch 44 turns off, operation of the compressor 11 is stopped. While the return pump 16 is in operation, however, operation of the compressor 11 is inhibited.

The air circuit has an air supply pipe extending from the high-pressure reservoir tank 15a to an air supply control valve 19. The valve 19 allows a small amount of air to pass through an orifice (not shown) thereof when turned on, and allows a large amount of air to pass through a large-diameter passage thereof (not shown), as well as through the orifice, when turned off. The air supply pipe bifurcates at a downstream side of the valve 19. One of the branches extending from a downstream side of the valve 19 to the front-wheel suspension units FS1 and FS2 has a front air-supply solenoid valve 20 and a check valve 21 arranged therein, and further bifurcates at a downstream side of the check valve 21, into two secondary pipes. One of the secondary pipes extends to the front left wheel suspension unit FS1 via a front-left solenoid valve 22 comprising a three-port selector valve, and the other secondary pipe extends to the front right wheel suspension unit FS2 via a front-right solenoid valve 23 similar to the valve 22. The valve 20 allows passage of air therethrough when turned on, and inhibits the air passage when turned off. The valves 22 and 23 each establish connection of the above-described air supply path and disconnect an air discharge path, mentioned later, when turned off, and disconnect the air supply path and establish connection of the air discharge path when turned on.

Likewise, the other branch extending from the downstream side of the valve 19 to the rear wheel suspension units RS1 and RS2 has a rear air-supply solenoid valve 24, similar to the valve 20, and a check valve 25 arranged therein, and further bifurcates at a downstream side of the check valve 25, into two secondary pipes. One of the secondary pipes extends to the rear left wheel suspension unit RS1 via a rear-left solenoid valve 26 similar to the valves 22 and 23, and the other secondary pipe extends to the rear right wheel suspension unit RS2 via a rear-right solenoid valve 27 similar to the valve 26.

An air discharge pipe of the air circuit extends from the suspension units FS1 to RS2 to the solenoid valves 22, 23, 26 and 27, respectively, and shares the secondary pipes with the air supply pipe. A pair of secondary pipes associated with the front wheel suspension units FS1 and FS2 join at a downstream side of the solenoid valves 22 and 23, and is connected to the low-pressure reservoir tank 15b through a discharge-direction selector valve 28 comprising a three-port selector valve. Similarly, a pair of secondary pipes associated with the rear wheel suspension units RS1 and RS2 Join at a downstream side of the solenoid valves 26 and 27, and is connected to the low-pressure reservoir tank 15b through a discharge-direction selector valve 32 similar to the valve 28.

The valves 28 and 32 each have a first outlet port connected to the tank 15b, as mentioned above, and a second outlet port connected to the drier 13 through a corresponding one of check valves 29 and 33 and a pipe L having a smaller diameter than the pipes connecting the first outlet ports of the valves 28 and 32 to the tank 15b. The valves 28 and 32 each connect an inlet port thereof to the first outlet port when turned on, and connect the inlet port to the second outlet port when turned off. Arranged between the drier 13 and the air cleaner 12 are a discharge solenoid valve 31 and a check valve 46, which form part of the discharge side of the air circuit in cooperation with the elements 12 and 13, such that air can be discharged through the air cleaner 12.

The suspension system further comprises various sensors connected to the control unit 36. Specifically, a sensor 34F for detecting the height of the front of the vehicle is arranged between a lower arm 35 of the front right suspension and the vehicle body, and a sensor 34R for detecting the height of the rear of the vehicle is arranged between a lateral rod 37 of the rear left suspension and the vehicle body. A vehicle speed sensor 38 is built in a speedometer, and four vertical acceleration sensors (only one is indicated at 51), a lateral acceleration sensor 52 and a longitudinal acceleration sensor 53 are arranged at suitable locations on the vehicle body for detecting the vertical acceleration, lateral acceleration, and longitudinal acceleration, respectively, acting on the vehicle body. Reference numeral 40 denotes a steering sensor for detecting the velocity of rotation of a steering wheel 41, i.e., the steering angular velocity, and 42 denotes an accelerator opening sensor for detecting the angle by which an accelerator pedal is depressed.

The operation of the active suspension system constructed as above will be now described.

The suspension system carries out the vehicle height control, the vehicle position control, and the riding quality control based on the skyhook damper theory, as mentioned above.

In the vehicle height control, the processor 36a of the control unit 36 determines whether the vehicle height is proper, based on the outputs of the vehicle height sensors 34F and 34R. If the vehicle height is smaller than a proper height, the front and rear air-supply solenoid valves 20 and 24 are turned on under the control of the processor 36a, whereby compressed air is supplied from the high-pressure reservoir tank 15a to the air spring chambers 3 of the suspension units S. When the proper vehicle height is reached, the valves 20 and 24 are turned off to stop the air supply. If, on the other hand, the vehicle height is greater than the proper height, the solenoid valves 22, 23, 26 and 27 and the discharge-direction selector valves 28 and 32 are turned on, whereby compressed air in the air spring chambers 3 is discharged to the low-pressure reservoir tank 15b. When the vehicle height has been reduced to the proper height, the discharge of air is stopped. This vehicle height control, however, is inhibited when the vehicle is turning, for example.

According to roll control which is a mode of the vehicle position control, when the steering wheel 41 is turned clockwise and thus the vehicle body tends to roll counterclockwise, the control unit 36 turns on the air-supply solenoid valves 20 and 24 for a set time, turns on the right-wheel solenoid valves 23 and 27, and turns on the discharge-direction selector valve 32 after lapse of a set time. As a result, a set amount of compressed air is supplied from the high-pressure reservoir tank 15a to the air spring chambers 3 of the left suspension units FS1 and RS1, while a set amount of compressed air is discharged from the air spring chambers 3 of the right suspension units FS2 and RS2 to the low-pressure reservoir tank 15b. Accordingly, counterclockwise roll of the vehicle body is suppressed. On detecting thereafter that the steering wheel 41 has been returned to a neutral position based on the output of the steering sensor 40, or that the lateral acceleration has decreased based on the output of the lateral acceleration sensor 52, the processor 36a of the control unit 36 judges that the traveling condition has changed from turning to straight travel. Immediately after making this judgment, the processor 36a turns off the solenoid valves 23 and 27 and the discharge-direction selector valve 32, whereby the pressures in the air spring chambers 3 of the left and right suspension units are made equal.

When the steering wheel 41 is turned counterclockwise, a procedure similar to the above is executed. Namely, compressed air is supplied to the air spring chambers 3 of the right suspension units FS2 and RS2, while compressed air is discharged from the air spring chambers 3 of the left suspension units FS1 and RS1, whereby clockwise roll of the vehicle body is suppressed.

In anti-nose dive control, when the negative acceleration detected based on the output of the longitudinal acceleration sensor 53 becomes greater than or equal to a set value due to, e.g., braking operation, the air-supply solenoid valve 20 is turned on for a set time, the rear-wheel solenoid valves 26 and 27 are turned on, and the discharge-direction selector valve 32 is turned on after lapse of a set time, under the control of the processor 36a. As a result, a set amount of compressed air is supplied from the high-pressure reservoir tank 15a to the front wheel suspension units FS1 and FS2, while a set amount of compressed air is discharged from the rear wheel suspension units RS1 and RS2 to the low-pressure reservoir tank 15b, whereby nose dive of the vehicle body is suppressed. When the negative acceleration decreases thereafter, the air-supply solenoid valves 22 and 23 are turned on for a set time, and the rear-wheel solenoid valves 26 and 27 are turned off. Hence compressed air is discharged from the front wheel suspension units FS1 and FS2, while compressed air is supplied to the rear wheel suspension units RS1 and RS2, whereby the internal pressures of the four air spring chambers 3 are returned to a pressure value assumed before the start of the control operation.

In anti-squat control for preventing floating of the front of the vehicle body at, e.g., acceleration of the vehicle from standstill, upon detecting a quick acceleration based on the output of the accelerator opening sensor 43 etc., the processor 36a of the control unit 36 turns on the air-supply solenoid valve 24 for a set time, turns on the front-wheel solenoid valves 22 and 23, and turns on the discharge-direction selector valve 32 after lapse of a set time. Consequently, compressed air is discharged from the front-wheel suspension units FS1 and FS2, while compressed air is supplied to the rear-wheel suspension units RS1 and RS2. When the quick acceleration ceases, the air-supply solenoid valve 20 and the rear-wheel solenoid valves 26 and 27 are turned on while the front-wheel solenoid valves 22 and 23 are turned off, whereby the internal pressures of the four air spring chambers 3 are returned to a pressure value assumed before the start of the control operation.

The skyhook damper theory-based riding quality control for the pneumatic active suspension system described above will be now described.

Figure 2:
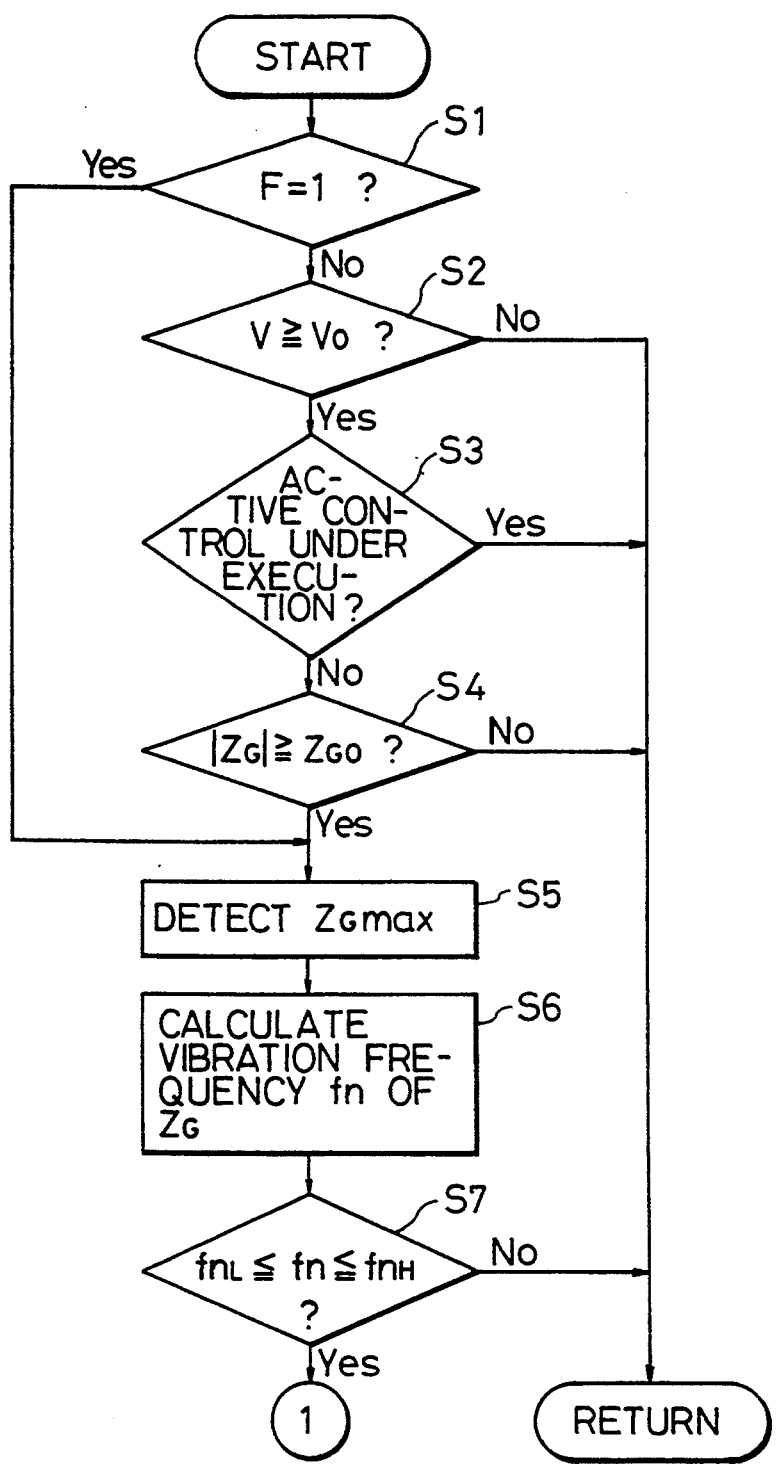
FIG. 2 is a flowchart showing part of a riding quality control procedure for carrying out the suspension operation control method, executed by a control unit shown in FIG. 1.
Figure 3:
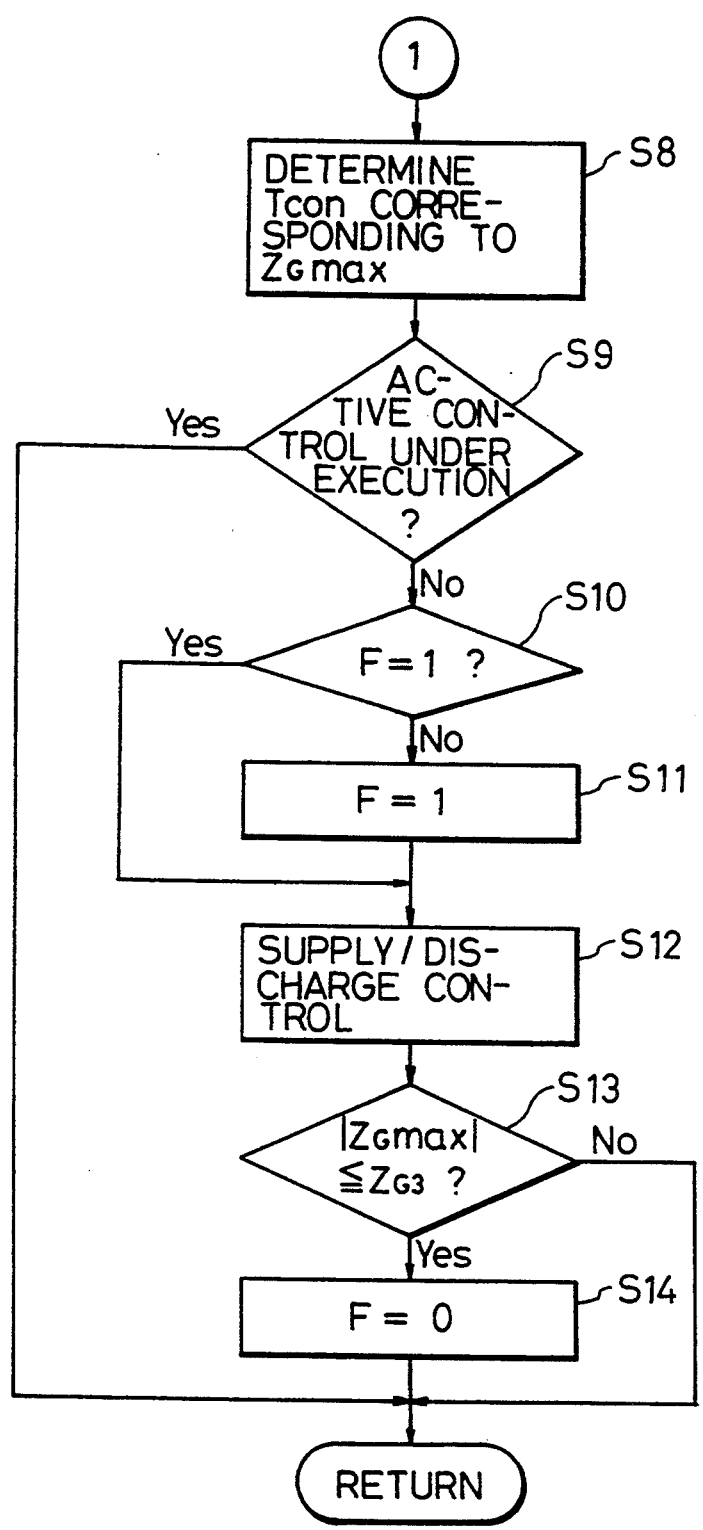
FIG. 3 is a flowchart showing the remaining part of the riding quality control procedure shown in FIG. 2.

When the ignition key of the vehicle is turned on by the driver, the processor 36a of the control unit 36 starts the riding quality control shown in FIGS. 2 and 3, which is executed periodically in parallel with various control operations including the aforementioned vehicle height and position control and an engine control known in the art. The riding quality control preferably utilizes the outputs of the four vertical acceleration sensors as control information, and is achieved by controlling the internal pressures of the air spring chambers 3 of the four suspension units S independently of one another. To this end, the control procedure shown in FIGS. 2 and 3 is executed for each of the suspension units S. In the following, the control procedure for one suspension unit will be described for simplicity of illustration.

In each control cycle of the riding quality control, the processor 36a first determines whether the value of a flag F stored in a built-in register is "1" which indicates that a supply/discharge control process (Step S12) of the riding quality control is under execution (Step S1). If the value of the flag F is not "1", the processor 36a reads the output of the vehicle speed sensor 38, and determines whether the vehicle speed V takes a value greater than or equal to a predetermined speed V0, e.g., 70 km/h, which represents a lower limit of a vehicle speed region in which the driver is likely to undergo the aforementioned wafting phenomenon (Step S2). If the vehicle speed V is lower than the predetermined speed V0 and thus can be regarded as falling within a region in which the wafting phenomenon rarely occurs, the processor 36a ends the present cycle of the riding quality control, without executing a substantial part thereof.

If it is judged in Step S2 that the vehicle speed V is higher than or equal to the predetermined speed V0, the processor 36a determines whether any other active control involving the supply/discharge control than the riding quality control (hereinafter merely referred to as "active control"), e.g., the aforementioned vehicle position control, is under execution (Step S3). If such active control is being executed, no substantial control is executed and the present cycle of the riding quality control is ended. Namely, the active control is executed in preference to the riding quality control.

If it is judged in Step S3 that no other active control is being executed, the processor 36a reads the output of the vertical acceleration sensor 51 associated with one suspension unit S, which is the subject of the supply/discharge control, and determines whether the absolute value |ZG| of the vertical acceleration takes a value greater than or equal to a predetermined level ZG0, e.g., 0.15 G, which represents occurrence of the wafting phenomenon (Step S4). If the absolute value |ZG| of the vertical acceleration is not greater than or equal to the predetermined level ZG0, the processor 36a ends the present cycle of the riding quality control, without executing a substantial part thereof.

If, on the other hand, it is judged in Step S4 that the absolute value |ZG| of the vertical acceleration is greater than or equal to the predetermined level ZG0, the processor 36a detects a maximum value ZGmax of the vertical acceleration ZG by monitoring the output of the vertical acceleration sensor, and stores the detected maximum value ZGmax in the memory 36b (Step S5). Then, the processor 36a calculates the vibration frequency fn of the vertical acceleration ZG (Step S6). For example, using a timer (not shown), the processor 36a measures a time TINT(+) or TINT(−) elapsed from the time at which the output of the vertical acceleration sensor 51 crossed a positive or negative threshold ZG(+) or ZG(−), which is equal to or greater than the predetermined level ZG0, before execution of Step S5 to the time at which the output; of the sensor 51 crossed the negative or positive threshold after execution of Step S5, and calculates a value equal to ½ of the inverse number of the measured time, i.e., ½TINT(+) or ½TINT(−), as the vibration frequency fn (see FIG. 4).

The processor 36a then determines whether the vibration frequency fn thus calculated takes a value greater than or equal to a lower limit fnL (e.g., 0.8 Hz) of a predetermined frequency range including the resonance frequency of the sprung side (vehicle body) and at the same time lower than or equal to an upper limit fnH (e.g., 1.2 Hz) of the predetermined frequency range, to thereby determine whether the calculated frequency fn falls within the predetermined frequency range (Step S7). If the vibration frequency fn of the vertical acceleration ZG is not close to the resonance frequency of the vehicle body, and thus it is judged that the wafting phenomenon unlikely to occur, the processor 36a ends the present cycle of the riding quality control, without executing a substantial part thereof. In this case, the maximum vertical acceleration value ZGmax stored in the memory 36b is cleared.

If it is judged in Step S7 that the vibration frequency fn of the vertical acceleration is close to the resonance frequency of the vehicle body, the processor 36a determines a supply/discharge control time Tcon corresponding to the maximum value ZGmax of the vertical acceleration, referring to a supply/discharge time map stored in the memory 36b of the control unit 36 (Step S8). Preferably, the product of the value Tcon determined in Step S8 and a predetermined value (e.g., 0.7), that is, 0.7 Tcon, is used as the supply/discharge control time Tcon for the first cycle of the supply/discharge control process (the control cycle in which the result of the determination in Step S1 is NO (F=0)), to thereby make the amount of air supply in the first and subsequent cycles of the supply/discharge control process equal to the amount of air discharge in these cycles.

Figure 5:
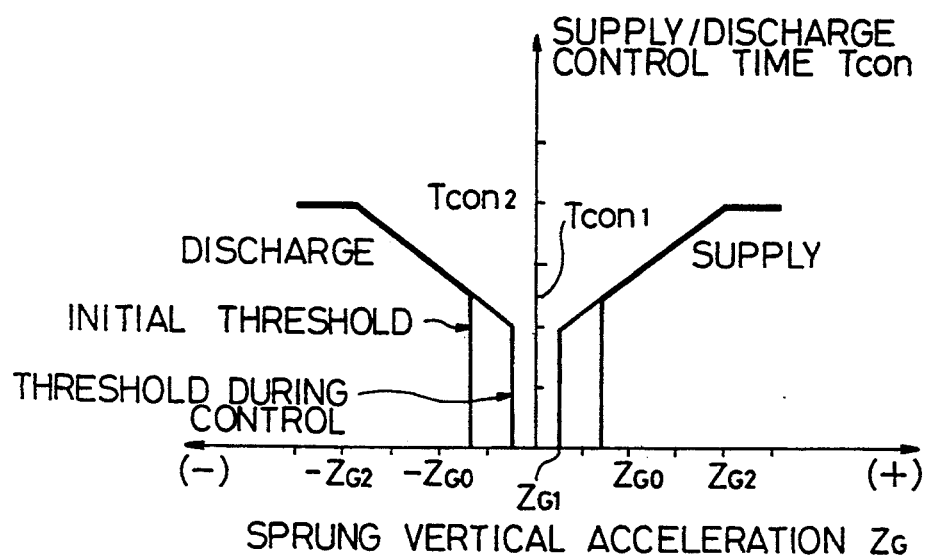
FIG. 5 is a graph showing an example of a supply/discharge time map used for the riding quality control of FIGS. 2 and 3.

The supply/discharge time map is set as shown in FIG. 5. Namely, if the absolute value |ZG| of the sprung vertical acceleration is equal to an acceleration threshold |ZG0| for starting the supply/discharge control, the supply/discharge time Tcon is set to a first predetermined time Tcon1, and if the absolute value |ZG| is greater than or equal to a predetermined value ZG2, the supply/discharge time Tcon is set to a second predetermined time Tcon2. If the absolute value |ZG| falls within the range between the threshold |ZG0| and the predetermined value |ZG2|, the supply/discharge time Tcon is linearly increased from the first predetermined time Tcon1 to the second predetermined time Tcon2 with increase in the absolute value |ZG|. Values ZG1 and −ZG1, which are smaller in absolute value than the thresholds ZG0 and −ZG0 for starting the control, are used as thresholds for determining the supply/discharge time Tcon after the sprung acceleration has decreased following the start of the supply/discharge control (i.e., thresholds for the second and the subsequent control cycles).

After determining the supply/discharge time Tcon in Step S8, the processor 36a again determines whether an active control is under execution (Step S9), and if an active control is being executed, the processor 36a ends the present cycle of the riding quality control, without executing a substantial part thereof. On the other hand, if no other active control is being executed, the processor 36a again determines whether the value of the flag F is "1" which indicates that the supply/discharge control process of the riding quality control is under execution (Step S10). Since, in the present case, the supply/discharge control process is not yet executed and the value of the flag F is not "1", the processor 36a sets the value of the flag F to "1" (Step S11), and executes the supply/discharge control process (Step S12).

Figure 8:
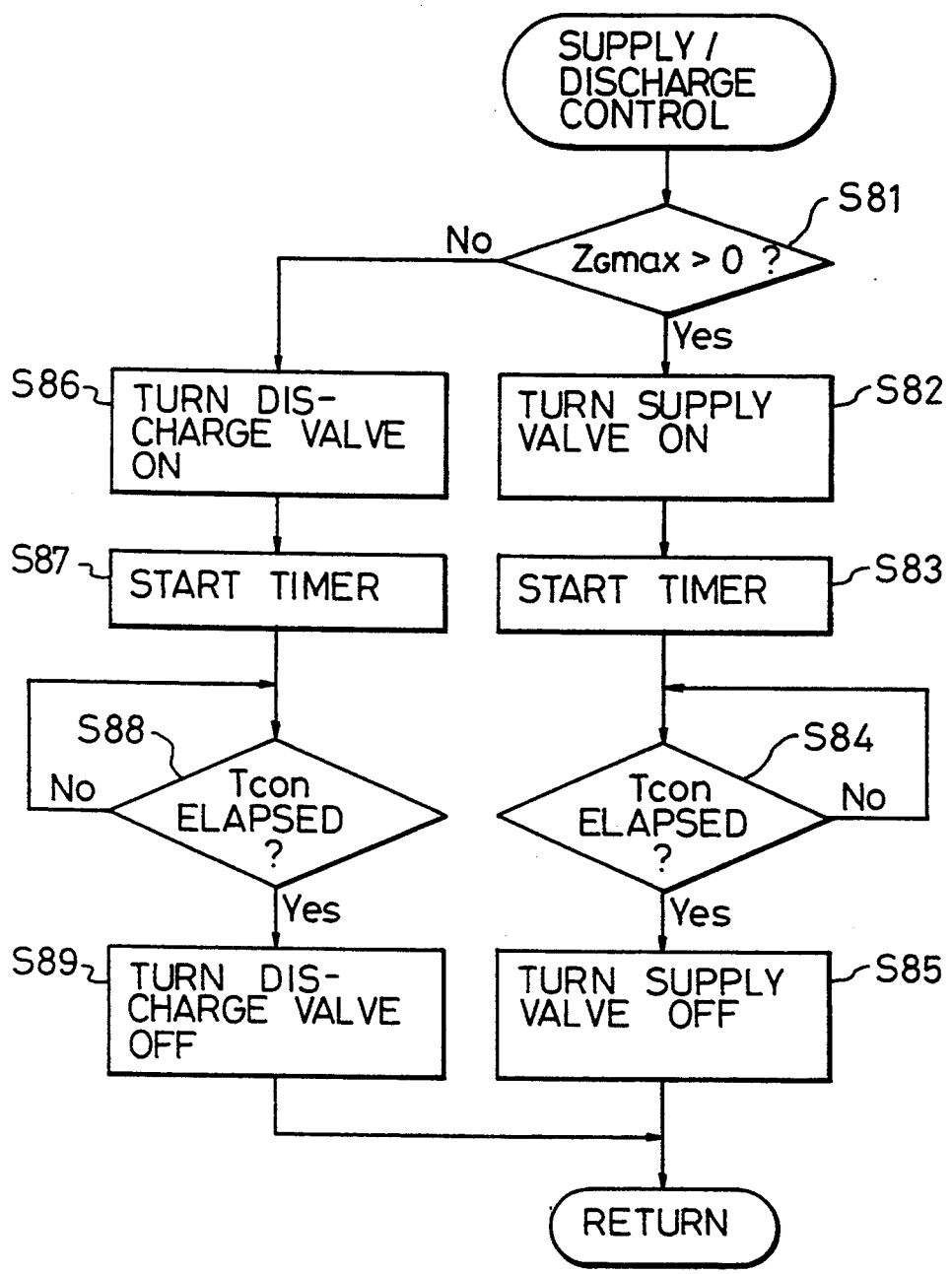
FIG. 8 is a flowchart illustrating details of a supply/discharge control process shown in FIG. 3.

In the supply/discharge control process shown in FIG. 8, the processor 36a first determines whether the sign of the maximum value ZGmax of the sprung vertical acceleration, detected in Step S5, is positive (+) (Step S81). If YES in Step S81, that is, if the sign of the maximum value ZGmax is positive (+), the processor 36a turns on one of the air-supply solenoid valves 20 and 24 (the valve associated with one of the four suspension units S which is the subject of the present description) (Step S82). As a result, supply of compressed air from the high-pressure reservoir tank 15a to the air spring chamber 3 of this suspension unit S is started.

In Step S83, the processor 36a sets, as an initial value, the time Tcon determined in Step S8 in a timer, e.g., a down-counter (not shown), for measuring the time elapsed from the ON (actuation) time of the air-supply solenoid valve 20 or 24, and starts the down-counter. The processor 36a then determines whether the count of the down-counter is "0", to thereby determine whether the set time Tcon has elapsed from the ON time of the air-supply solenoid valve (Step S84). Immediately after the airsupply solenoid valve 20 or 24 is turned on, the result of the determination in Step S84 is NO, and accordingly, Step S84 is repeatedly executed. If it is judged thereafter in Step S84 that the set time Tcon has passed, the processor 36a turns off the air-supply solenoid valve 20 or 24 which was turned on in Step S82 (Step S85), and ends the first cycle of the supply/discharge control process, whereupon the flow returns to Step S13 of the main routine shown in FIGS. 2 and 3.

As a result of execution of the first cycle of the supply/discharge control process as described above, compressed air is supplied from the reservoir tank 15a to the air spring chamber 3 of the suspension unit S for the set time Tcon. As a set amount of compressed air is supplied to the air spring chamber 3 in this manner, the internal pressure of the air spring chamber increases, whereby a force corresponding to the increment of the internal pressure and acting to cancel out the downward sprung velocity is produced.

After completing the present cycle of the supply/discharge control process, the processor 36a again detects a maximum value of the output of the vertical acceleration sensor and stores the detected maximum value, and then determines whether the absolute value |ZGmaxi| of the maximum acceleration takes a value smaller than or equal to a predetermined value ZG3 (e.g., 0.05 G) which indicates that the wafting phenomenon is not occurring (Step S13). In the present case, the first cycle of the supply/discharge control process has just been completed, and accordingly, in general, the result of the determination in Step S13 becomes NO.

In this case, the program returns to Step S1, and executes Step S1 and the subsequent steps again. In Step S1, however, it is judged that the value of the flag F is "1", and therefore, the program proceeds from Step S1 to S5 in which ZGmax is detected. If fnL≦fn≦fnH, the time Tcon corresponding to ZGmax is determined, and if no active control is under execution, the second cycle of the supply/discharge control process is started.

In the case where the maximum value ZGmax of the sprung vertical acceleration associated with the first cycle of the supply/discharge control process has a positive sign (+) as in the above-described case, the maximum value ZGmax detected in Step S5 of the cycle of the main routine associated with the second cycle of the supply/discharge control process has a negative sign (−), and accordingly, the result of the determination in Step S81 shown in FIG. 8 becomes NO. In this case, the processor 36a turns on corresponding ones of the solenoid valves 22, 23, 26 and 27 and the discharge-direction selector valves 28 and 32 (Step S86). As a result, discharge of compressed air from the air spring chamber 3 of the suspension unit S to the low-pressure reservoir tank 15b is started.

In Step S87, the processor 36a sets, as an initial value, the time Tcon determined in Step S8 in a timer, e.g., a down-counter (not shown), for measuring the time elapsed from the ON (actuation) time of the corresponding ones of the solenoid valves and dischargedirection selector valves, and starts the down-counter. The processor 36a then determines whether the set time Tcon has elapsed from the valve ON time (Step S88). Immediately after the valves are turned on, the result of the determination in Step S88 becomes N0, and Step S88 is repeatedly executed. If it is judged thereafter in Step S88 that the set time Tcon has passed, the processor 36a turns off the valves which were turned on in Step S86 (Step S89), and ends the second cycle of the supply/discharge control process, whereupon the program returns to Step S13 of the main routine shown in FIGS. 2 and 3.

As a result of execution of the second cycle of the supply/discharge control process as described above, the compressed air in the air spring chamber 3 is discharged to the low-pressure reservoir tank 15b for the set time Tcon. As a set amount of compressed air is discharged from the air spring chamber 3 in this manner, the internal pressure of the air spring chamber decreases, whereby a force corresponding to the decrease of the internal pressure and acting to cancel out the upward sprung velocity is produced.

Thereafter, supply of compressed air, similar to that executed in the first cycle of the supply/discharge control process, and discharge of compressed air, similar to that executed in the second cycle of the supply/discharge control process, are alternately carried out until the absolute value |ZGmax| of the maximum sprung vertical acceleration becomes lower than or equal to the predetermined value ZG3. In the case where the maximum value ZGmax of the sprung vertical acceleration associated with the first cycle of the supply/discharge control process has negative sign (−), unlike the above-described case, discharge of compressed air is carried out in the first cycle of the supply/discharge control process, and thereafter, supply and discharge of compressed air are alternately carried out.

The supply/discharge control will be described in more detail with reference to FIG. 4. A supply/discharge time to be applied approximately half a cycle later is determined based on the maximum value ZGmax of the sprung vertical acceleration. Specifically, if the value ZGmax is positive, a supply time for approximately half a cycle later is determined, and if the value ZGmax is negative, a discharge time for approximately half a cycle later is determined. In other words, if the sign of the maximum value ZGmax of the sprung vertical acceleration is positive, the air supply control is initiated when a time period corresponding approximately to half the cycle of variation of the sprung vertical acceleration has elapsed from the generation of the corresponding maximum value ZGmax, and if the sign of the maximum value ZGmax is negative, the air discharge control is initiated when a time period corresponding approximately to half the cycle of the variation has elapsed from the generation of the corresponding maximum value ZGmax.

Figure 4:
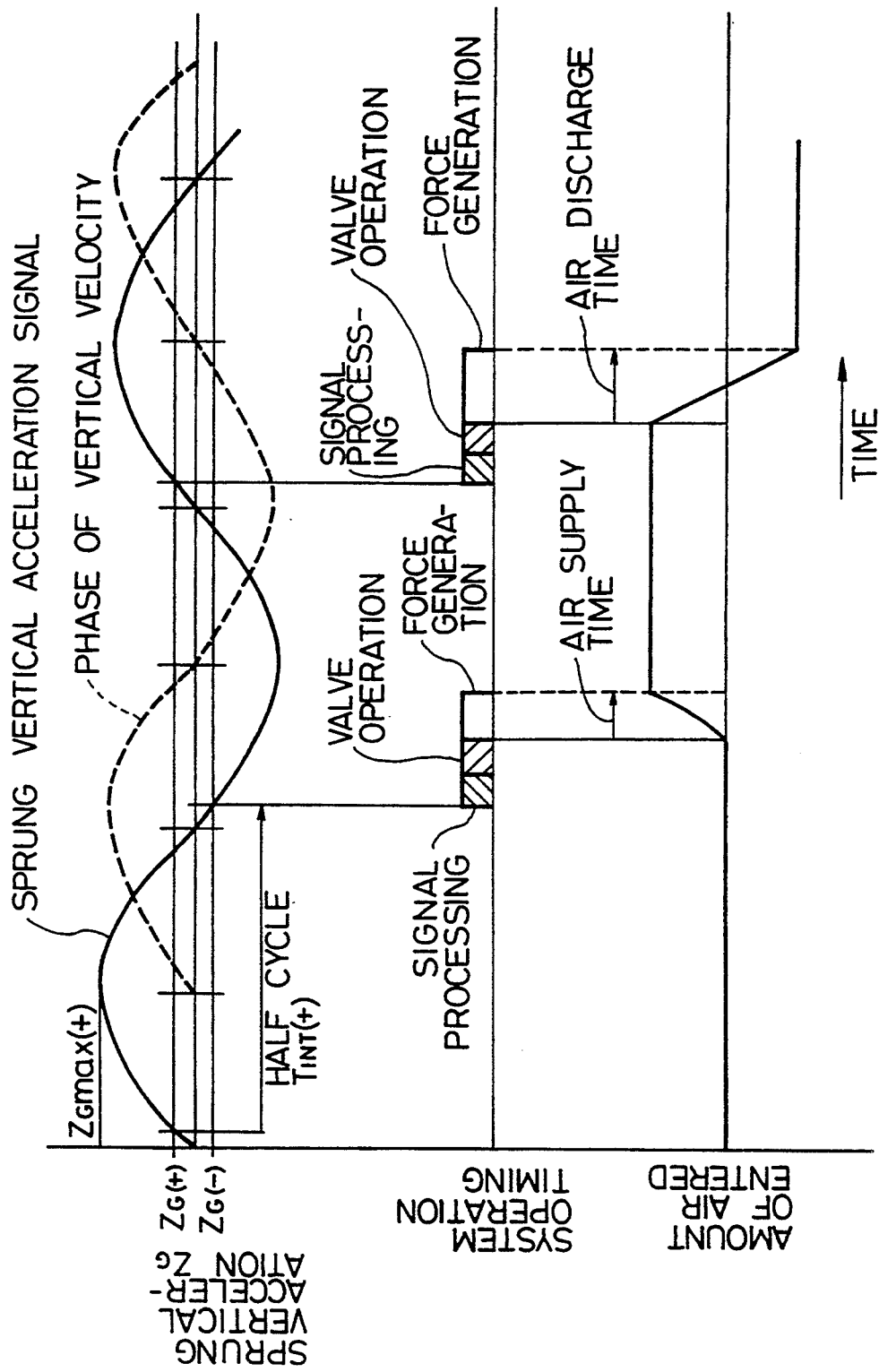
FIG. 4 is a graph illustrating a method of calculating the vibration frequency of sprung vertical acceleration in the riding quality control and execution timing for supply/discharge control.
Figure 6:
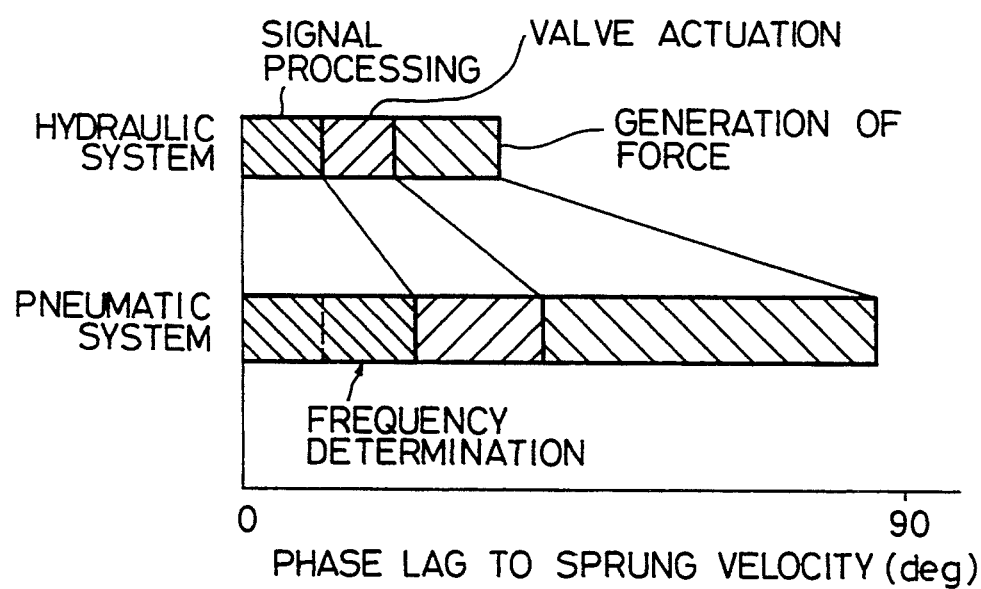
FIG. 6 is a graph showing a delay in operation of a pneumatic suspension system.
Figure 7:
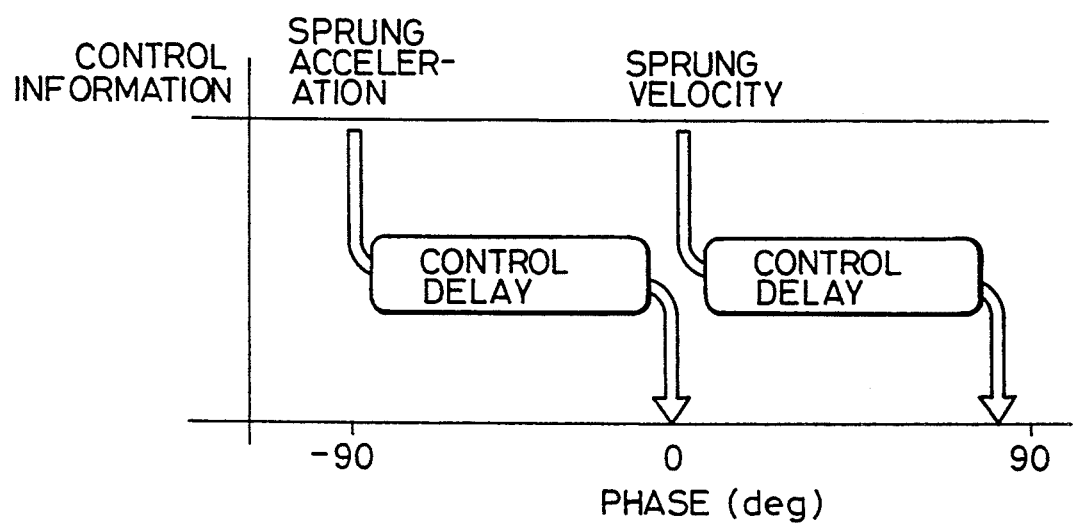
FIG. 7 is a chart showing timing for generation of a force which is based on the sprung acceleration and capable of compensating for the operation delay of the pneumatic suspension system.

As shown in FIGS. 4 and 6, a certain length of time is consumed by a series of signal processing in Steps S1 to S11, the actuation of the valves in the air circuit in accordance with the results of the signal processing, and by the generation of the aforementioned force by means of the valve actuation. In other words, the pneumatic suspension system is subject to operation delay. Since, in particular, the operating medium used is air having compressibility, the pneumatic system requires a considerably long time from completion of the valve actuation to actual generation of the force, compared with the hydraulic system. If the force is generated based on the sprung velocity, as in a conventional hydraulic active suspension system, the phase lag of generation of the force with respect to the sprung velocity is, in a typical case, about 90 degrees (FIGS. 6 and 7), and the force is generated at improper timing.

Therefore, in the present embodiment, the sprung acceleration, which is advanced in phase by 90 degrees from the sprung velocity, is used to determine the need for the supply/discharge control and to determine the supply/discharge time, in place of the sprung velocity used in the conventional system, as described above. Namely, in the pneumatic system which requires a significant time from completion of the signal processing, which includes the determination of the need for the supply/discharge control, to actual generation of the force, the start of the supply/discharge control is, according to this embodiment, advanced by a time corresponding to the operation delay of the pneumatic system. Consequently, the operation delay of the pneumatic system is substantially compensated for, and the force acting to suppress the sprung velocity is generated at required timing.

If it is judged in Step S13 of a later cycle of the main routine that the absolute value |ZGmax| of the maximum vertical acceleration has become smaller than or equal to the predetermined value ZG3, that is, if it is judged that the wafting phenomenon is not occurring, the processor 36a resets the flag F to 37 0" which indicates completion of a series of supply/discharge control process (Step S14), and ends the riding quality control shown in FIGS. 2 and 3.

Compressed air is supplied to and discharged from the air spring chamber 3 in such a manner that the air supply and the air discharge are carried out the same number of times. Therefore, if it is Judged in Step S13 that the riding quality control should be ended, after the supply/discharge control process has been executed an odd number of times, the program proceeds to an auxiliary supply/discharge control process (not shown) subsequent to the riding quality control of FIGS. 2 and 3, and compressed air is discharged if air supply was carried out in the last cycle of the control process of FIGS. 2 and 3, or compressed air is supplied if air discharge was carried out in the last cycle.

This auxiliary supply/discharge control process is carried out also for the other three suspension units S, like the aforementioned suspension unit S, whereby the vehicle height is returned to the same level as before the start of the riding quality control.

Figure 20:
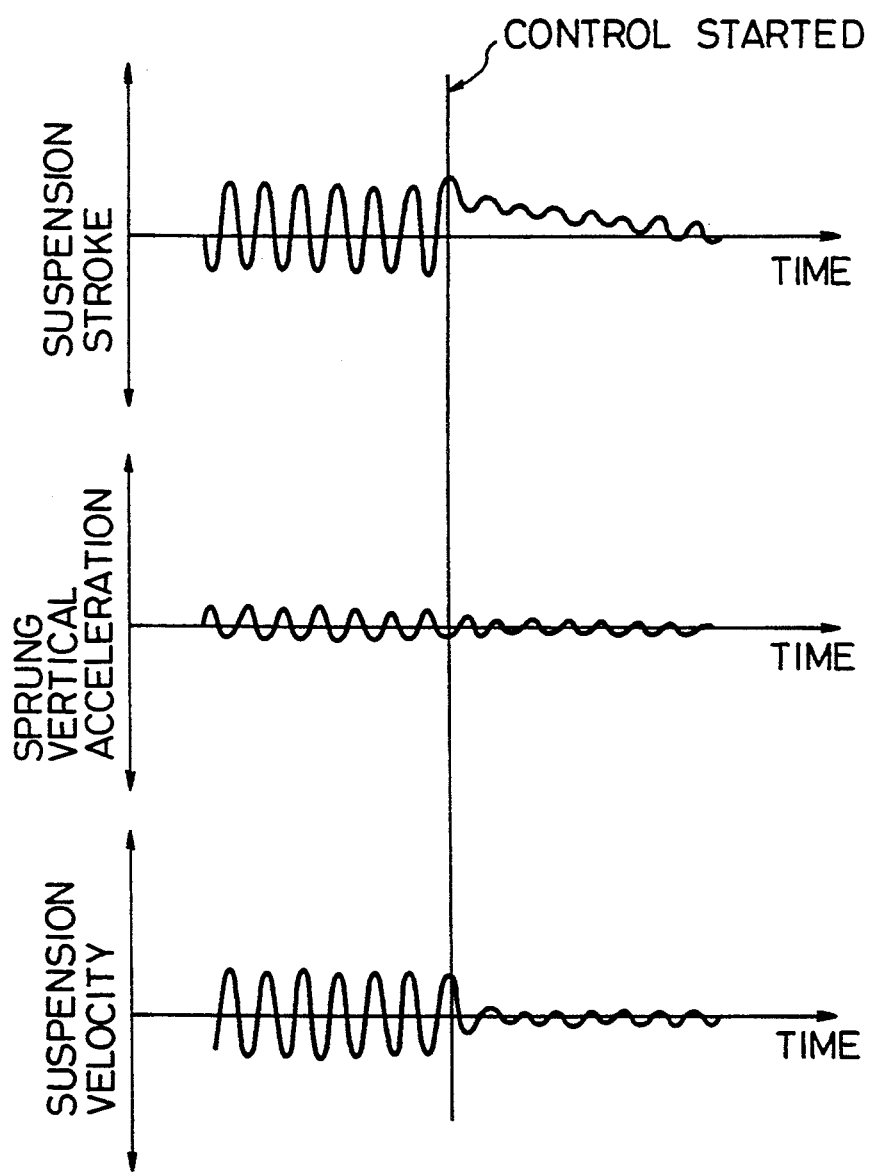
FIG. 20 is a graph showing time-based changes of suspension stroke, sprung vertical acceleration and suspension velocity, observed when the active suspension operation control method according to the first embodiment is executed.
Figure 21:
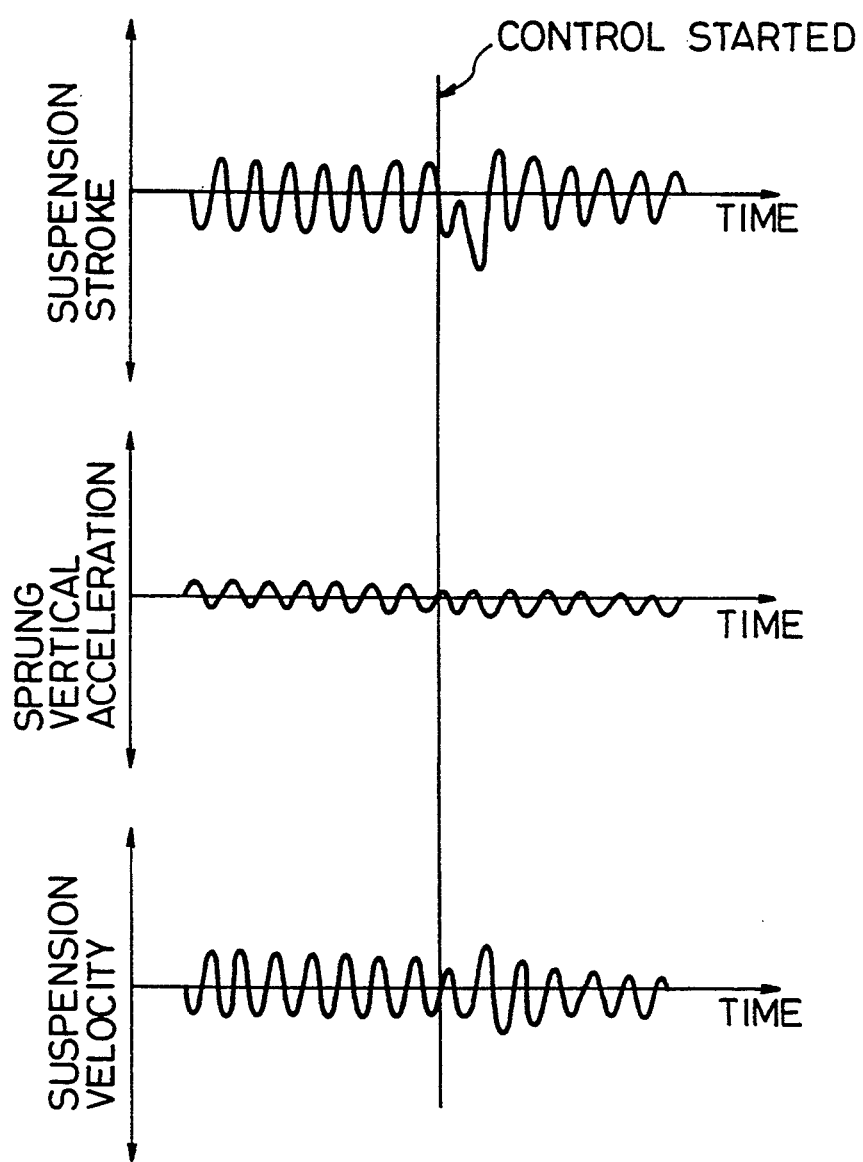
FIG. 21 is a graph similar to FIG. 20, illustrating corresponding changes with time observed when a conventional active suspension operation control method is executed.

FIGS. 20 and 21 illustrate time-based changes of suspension stroke, sprung vertical acceleration and suspension velocity, observed when the method of the present embodiment and a conventional method similar to that disclosed in U.S. Pat. No. 4,856,815 are applied to suspension system, respectively. As seen from FIGS. 20 and 21, the method of the present embodiment is by far effective in damping the vibration of the vehicle body.

An operation control method for a fluid active suspension apparatus, according to a second embodiment of the present invention, will be now described.

The method of this embodiment is characterized in that the supply and discharge of operating medium to and from the front- and rear-wheel actuators can be controlled in accordance with the output of a single sensor which is arranged at the sprung side near the front wheels for detecting a vertical motion-related parameter, thereby eliminating the need for using a plurality of sensors and reducing the cost of the apparatus.

Since the method of this embodiment can be carried out by a system having substantially the same construction as the pneumatic active suspension system of FIG. 1 for carrying out the method of the first embodiment, description of the apparatus is omitted. Unlike the first embodiment using four vertical acceleration sensors, however, the pneumatic suspension system for carrying out the method of the second embodiment includes a single vertical acceleration sensor (more generally, a vertical motion parameter sensor) arranged at the front wheel side for detecting the vertical acceleration of the sprung side (vehicle body) as control information for use in the riding quality control.

The vehicle height control and vehicle position control for this suspension system are executed in the same manner as in the first embodiment, and therefore, description thereof is omitted.

The skyhook damper theory-based riding quality control for the suspension system will be described.

Figure 9:
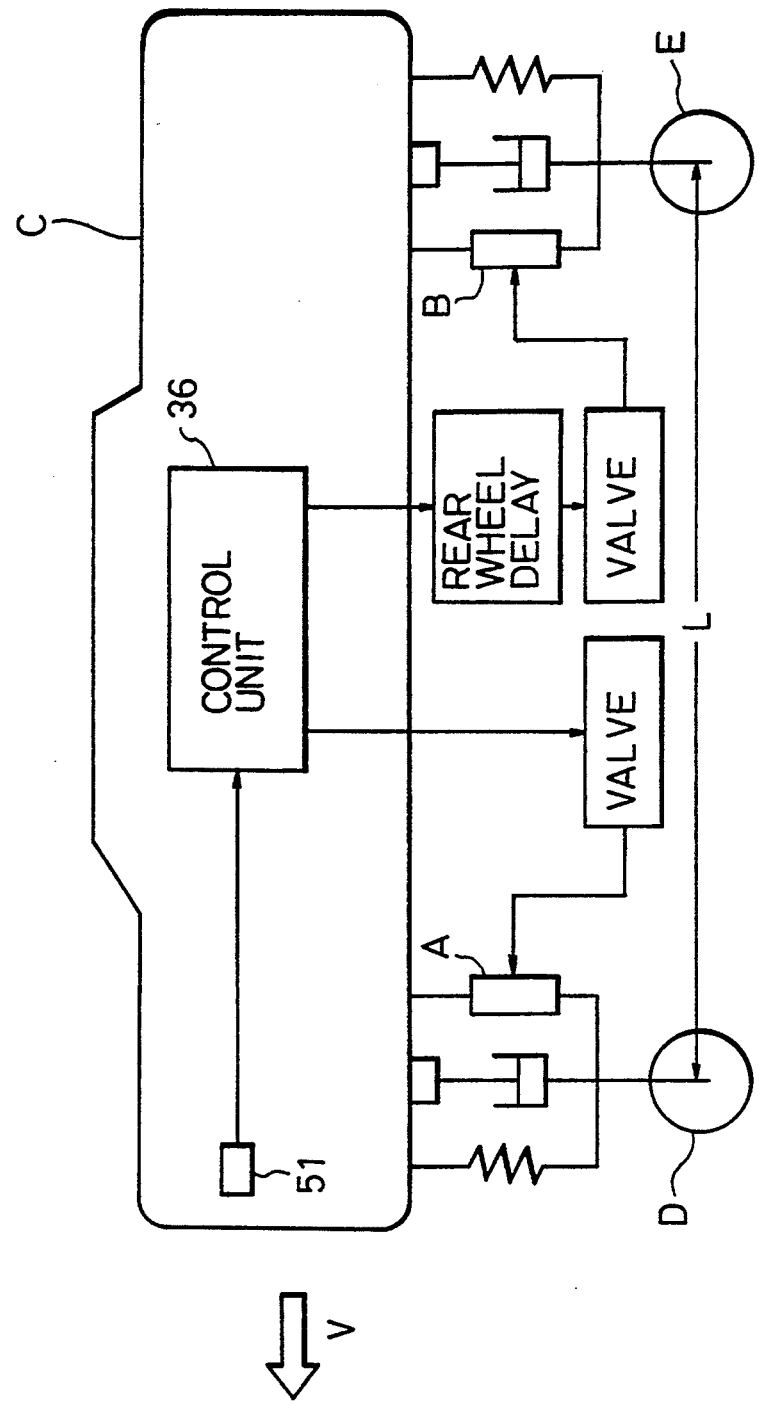
FIG. 9 is a diagram illustrating the concept of an operation control method for a pneumatic active suspension system according to a second embodiment of the present invention.

As shown in the conceptual diagram of FIG. 9, the riding quality control of this embodiment uses, as control information, the sprung vertical acceleration detected as a sprung vertical motion-related parameter by a single vertical acceleration sensor 51, which is arranged at the sprung side (vehicle body C) near the front wheels D. The control unit 36, to which the output of the vertical acceleration sensor 51 is supplied, performs integrated control on the supply and discharge of air to and from two front-wheel actuators A corresponding to the air spring chambers 3 of the suspension units FS1 and FS2 shown in FIG. 1, by operating valves (valve 20 etc. in FIG. 1) associated with the actuators A, whereby the sprung vertical velocity (more generally, sprung vertical motion) of the front-wheel side is suppressed. When a delay time determined by the vehicle speed V, wheelbase L, etc., has passed from the start of the integrated control of the front-wheel side, the control unit 36 performs integrated control on the supply and discharge of air to and from two rear-wheel (E) side actuators B corresponding to the suspension units RS1 and RS2, by operating valves (valve 24 etc. in FIG. 1) associated with the actuators B, whereby the sprung vertical velocity of the rear-wheel side is suppressed.

In contrast to the operation control method for suspension system wherein the actuators associated with the respective wheels are controlled independent of one another based on the outputs of a plurality of sensors, the method of this embodiment, in which integrated control of the two front-wheel actuators A and integrated control of the two rear-wheel actuators B are executed based on the output of a single sensor, can prevent the control interference between diagonally located wheels or between longitudinally located wheels, thus permitting natural behavior of the vehicle during travel. Further, since useless control action that may cause the control interference is not executed, energy consumption of the actuators can be reduced.

The riding quality control according to this embodiment will be now described in detail.

Figure 10:
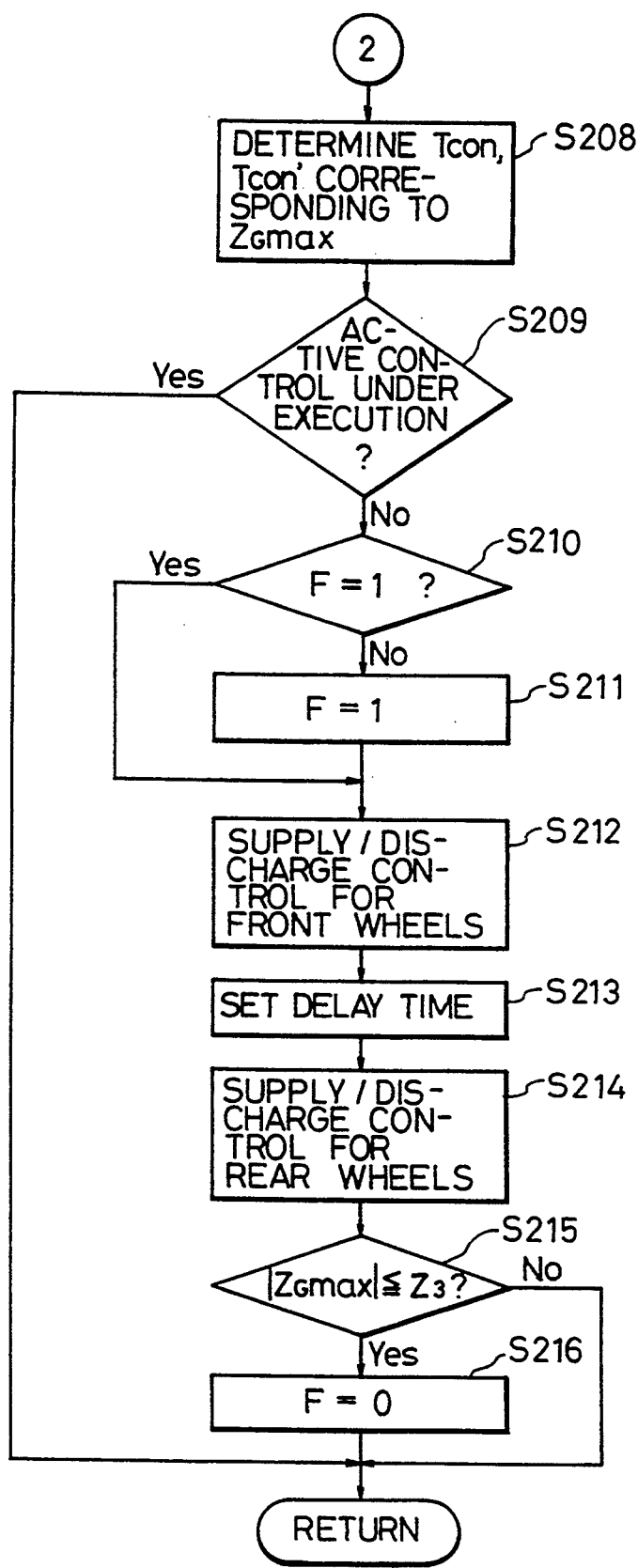
FIG. 10 is a flowchart showing part of a riding quality control procedure according to the method of the second embodiment.

When the ignition key (not shown) of the motor vehicle is turned on by the driver, the processor 36a of the control unit 36 starts the riding quality control, which is executed periodically in parallel with various control operations and part of which is shown in FIG. 10.

In each control cycle of the riding quality control, the processor 36a successively executes a series of steps (not shown) corresponding to Steps S1 to S7 of FIG. 2, as in the first embodiment. If the vehicle speed V is lower than the predetermined vehicle speed V0, or if an active control other than the riding quality control is under execution, or if the absolute value |ZG| of the vertical acceleration is smaller than the predetermined level ZG0, or if the vibration frequency fn of the vertical acceleration ZG is outside the predetermined frequency range, the processor 36a ends the present cycle of the riding quality control, without executing a substantial part thereof.

If conditions (a)-(e) are all fulfilled: (a) the value of the flag F is not "1", (b) the vehicle speed V is higher than or equal to the predetermined speed V0, (c) no active control is under execution, (d) the absolute value |ZG| of the vertical acceleration is greater than or equal to the predetermined level ZG0, and (e) the vibration frequency fn of the vertical acceleration ZG is within the predetermined frequency range; or if the value of the flag F is "1", the processor 36a determines front- and rear-wheel supply/discharge control times Tcon and Tcon' corresponding to the maximum value ZGmax of the vertical acceleration, referring to front- and rear-wheel supply/discharge time maps (not shown) stored in the memory 36b of the control unit 36 (Step S208). The front-wheel supply/discharge time map is set in the same manner as shown in FIG. 5 explained with reference to the first embodiment. The rear-wheel supply/discharge time map is set similar to the front-wheel map, but in general, first and second predetermined times Tcon1' and Tcon2' of the rear-wheel map, which correspond to the first and second predetermined times Tcon1 and Tcon2 of the front-wheel map, respectively, are set to values different from Tcon1 and Tcon2, respectively (though they can be set to the same values). In other words, the supply/discharge control gain associated with the front-wheel side generally differs from that associated with the rear-wheel side. The supply/discharge control gain for the rear-wheel side may be selected from among a plurality of sources, in accordance with whether the rear seat of the vehicle is occupied by a person or the like. In this case, a load sensor or the like is provided for detecting the loaded state of the rear seat, and one of a plurality of rear-wheel maps is selected based on the sensor output.

After determining the front- and rear-wheel supply/discharge times Tcon and Tcon' in Step S208, the processor 36a again determines whether an active control is under execution (Step S209), and if no active control is under execution, determines whether the value of the flag F is "1" (Step S210). If NO in Step S210, the processor 36a sets the value of the flag F to "1" (Step S211), and then executes a front-wheel supply/discharge control process corresponding to the supply/discharge control process (Step S12 of FIG. 3) of the first embodiment (Step S212).

Then, referring to a delay time map which is set as shown in FIG. 11, the processor 36a sets a delay time LST corresponding to the vehicle speed V (Step S213). The delay time LST is equal to a value $((L/V)-DT)$ which is obtained by subtracting a rear response delay DT from the value obtained by dividing the wheelbase L by the vehicle speed V. The rear response delay DT is a constant for compensating for a delay of the supply of compressed air from the high-pressure reservoir tank 15a, which is arranged at the front-wheel side, to the rear-wheel suspension units RS1 and RS2. On judging that the delay time, set in Step S213, has passed after the front-wheel supply/discharge control process is started in Step S212, the processor 36a starts a rear-wheel supply/discharge control process (Step S214).

After completing the present cycle of the rear-wheel supply/discharge control, the processor 36a again detects a maximum value of the output of the vertical acceleration sensor and stores the detected maximum value, and then determines whether the absolute value |ZGmax| of the maximum acceleration has become smaller than or equal to the predetermined value ZG3 which indicates that the wafting phenomenon is not occurring (Step S215). If NO in Step S215, Step S207 and the subsequent steps are executed again. In this case, it is Judged in Step S210 that the value of the flag F is "1", and accordingly, the program proceeds from Step S210 to Step S212 for the front-wheel supply/discharge control process, without executing Step S211.

If, in Step S215 of a later cycle, the absolute value |ZGmax| of the maximum vertical acceleration is found to be smaller than or equal to the predetermined value ZG3, and thus it is judged that no wafting phenomenon is occurring, the processor 36a resets the flag F to "0" which indicates completion of a series of supply/discharge control process (Step S216), and ends the riding quality control.

The processor 36a executes an auxiliary supply/discharge control process (not shown) as needed, such that air is supplied to and discharged from the air spring chambers 3 of the individual front- and rear-wheel sides the same number of times, whereby the vehicle height is returned to a level assumed before the start of the riding quality control.

An operation control method for a pneumatic active suspension system, according to a third embodiment of the present invention, will be now described.

The method of this embodiment was contrived in view of the fact that an active suspension system using three or four vertical acceleration sensors is costly, and that motor vehicles to which active control is applied are usually provided with displacement sensors such as a vehicle height sensor or stroke sensor used for vehicle height control or vehicle position control. The method is characterized in that control information used the in active control for suppressing the sprung vertical motion is generated by a low-cost control information generator, thereby eliminating the need of a specialized sensor.

To this end, a suspension system to which the method of this embodiment is applied has a basic arrangement similar to that of the suspension system associated with the first embodiment, and is further provided with a control information generator, described in detail later, for generating control information for use in the riding quality control. The suspension system includes vehicle height sensors, not shown, which are respectively arranged on the left side of the front of the vehicle and on the right side of the rear of the same, and which are similar to the sensors 34F and 34R (in the following, reference numeral 34 is used to indicate the vehicle height sensors collectively, without making a distinction therebetween).

Figure 12:
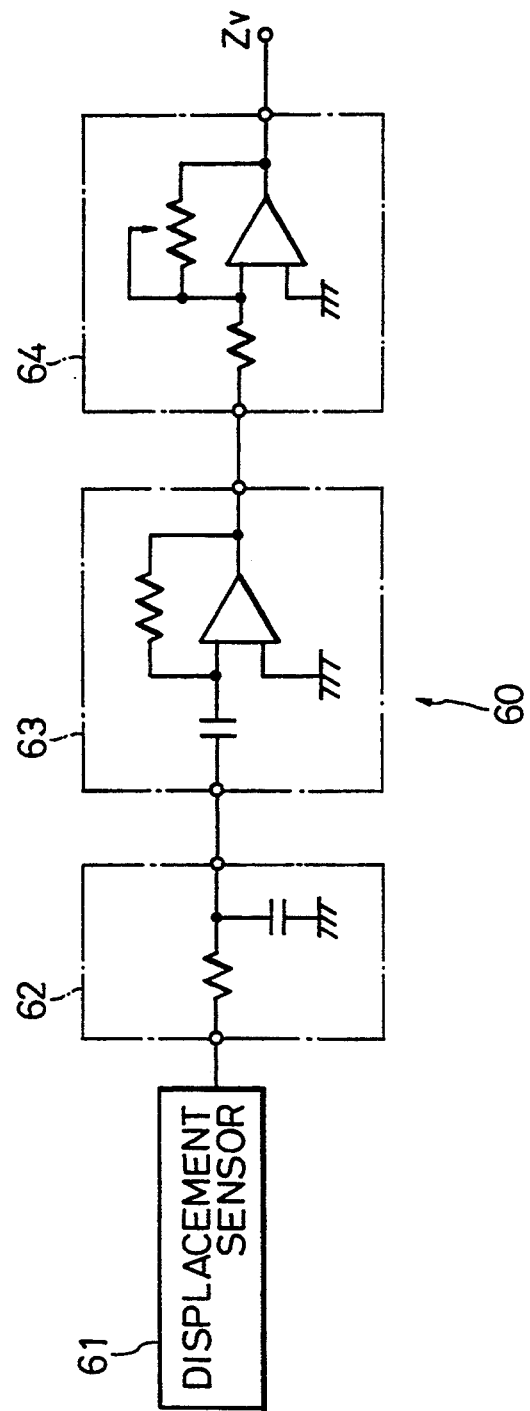
FIG. 12 is circuit diagram schematically illustrating a control information generator for a pneumatic active suspension system, to which a method according to a third embodiment of the present invention is applied.

The control information generator of the suspension system preferably includes four velocity information generating sections corresponding to the four wheels and having an identical arrangement (only one of the velocity information generating sections is indicated at 60 in FIG. 12). Each velocity information generating section 60 generates information ZV representing the relative vertical velocity between the sprung and unsprung sides, for use in the riding quality control. When the processor 36a of the control unit 36 judges that the velocity information ZV is greater than or equal to a predetermined level and at the same time that the frequency of the information ZV falls within a predetermined frequency range, the velocity information ZV is used as supply/discharge control information. Namely, the control information generator is composed of the four velocity information generating sections 60 and the processor 36a having the function of making the above discriminations.

More specifically, each velocity information generating section 60 includes a displacement sensor (stroke sensor) 61 for detecting the relative displacement between the sprung and unsprung sides near the corresponding wheel, and in this embodiment, the vehicle height sensor 34, which is generally used for the vehicle height control, is used as the displacement sensor 61. The velocity information generating section 60 further includes a low-pass filter circuit 62 for removing a component of the sensor output that is unnecessary for the supply/discharge control, e.g., a high-frequency component of the sensor output generated when the vehicle moves over a protrusion in the road surface, a differentiating circuit 63 for differentiating the output of the filter circuit, and a gain control circuit 64 formed of an inverting amplifier for compensating for a reduction of the gain caused by phase adjustment. The output side of the displacement sensor 61 is connected to the input side of the filter circuit 62, whose output side is connected to the gain control circuit 64 via the differentiating circuit 63, and the gain control circuit 64 is connected to the control unit 36.

The filter circuit 62 has, in addition to the low-pass filtering function, the function of adjusting the phase lag or phase advance of the sensor output, and generates velocity information ZV having a phase close to the phase of the sprung vertical acceleration and representing the relative velocity between the sprung and unsprung sides, in cooperation with the differentiating circuit 63. In other words, the filter circuit 62 is composed of a resistor and a capacitor, and the resistance of the resistor and the capacitance of the capacitor are so selected that the phase adjusting function (phase compensating function) is achieved by the filter circuit 62. In general, it is difficult to select a circuit constant such that the filter circuit has both the low-pass filtering function and the phase adjusting function over a wide frequency range; however, in the case of the subject of the riding quality control of this embodiment, i.e., the frequency range of sprung vertical vibration (sprung resonance frequency range), it is possible to select a filter circuit constant such that the filter circuit 62 can achieve both of these functions.

In the case where the filter circuit 62 is so constructed as to adjust the phase lag, the velocity information ZV is generated not in the same cycle of sprung vibration, but in the subsequent cycle of sprung vibration. However, in the vibration frequency range to be detected, which corresponds to the sprung resonance frequency range determined by the weight of the vehicle body and the spring constant of the suspension and having a substantially fixed range, the sprung vibration frequency is almost constant on the time base and is subject to no change with time. Accordingly, no disadvantages arise if the velocity information ZV obtained by delaying the phase of the displacement sensor output is used for the riding quality control.

The velocity information ZV has a phase close to the phase of the sprung vertical acceleration, as mentioned above. This is useful when carrying out the riding quality control by means of the pneumatic active suspension system shown in FIG. 1. Generally, the pneumatic active suspension is advantageous in that the cost is low because inexpensive control valves can be used, but it also has a drawback in that the operation response is slow as compared compressibility is used as the operating medium. Specifically, a substantial length of time is required after air is supplied to or discharged from an actuator (air spring chamber 3 of the suspension unit S) through various valves, which respond to a control signal supplied from the control unit 36 in accordance with the velocity information ZV, until a force acting to cancel out the vertical vibration input from the road surface is actually produced, and it is generally difficult to produce the force at proper timing. The velocity information ZV generated in this embodiment has a phase close to the sprung vertical acceleration, that is, the information ZV is advanced in phase with respect to the sprung vertical velocity. Thus, by using the velocity information ZV, it is possible to carry out the supply/discharge control of the actuators at advanced timing, and to compensate for the operation delay of the pneumatic system.

The differentiating circuit 63 of the control information generator will be described in detail. The output of the vehicle height sensor 34 often has dependence on the direction of stroke of the suspension (more generally, the direction of relative displacement between the sprung and unsprung sides), due to the influence of friction etc. of the suspension unit S. Namely, the sensor output may indicate different values, depending on the direction of the stroke. Thus, if the output of the vehicle height sensor 34 as the displacement sensor 61, i.e., stroke information, is used directly as the control information for the riding quality control, drawbacks can possibly be caused. In this embodiment, the velocity information is obtained by differentiating the output of the vehicle height sensor 34 serving as the displacement sensor 61 at the differentiating circuit 63, and this velocity information is more suitable as the control information in that it faithfully reflects change in the stroke of the suspension (more generally, change in the relative displacement between the sprung and unsprung sides) and has no dependence on the direction of the stroke.

The vehicle height control and vehicle position control executed by this suspension system are identical with those carried out in the first embodiment, and therefore, description thereof is omitted.

Further, the riding quality control of this embodiment is identical with the riding quality control (FIGS. 2 and 3) of the first embodiment, except that it uses the output ZV of the velocity information generating section 60 representing the relative vertical velocity between the sprung and unsprung sides, in place of the sprung vertical acceleration ZG, as the control information. Accordingly, the riding quality control of this embodiment will be explained in brief.

Figure 13:
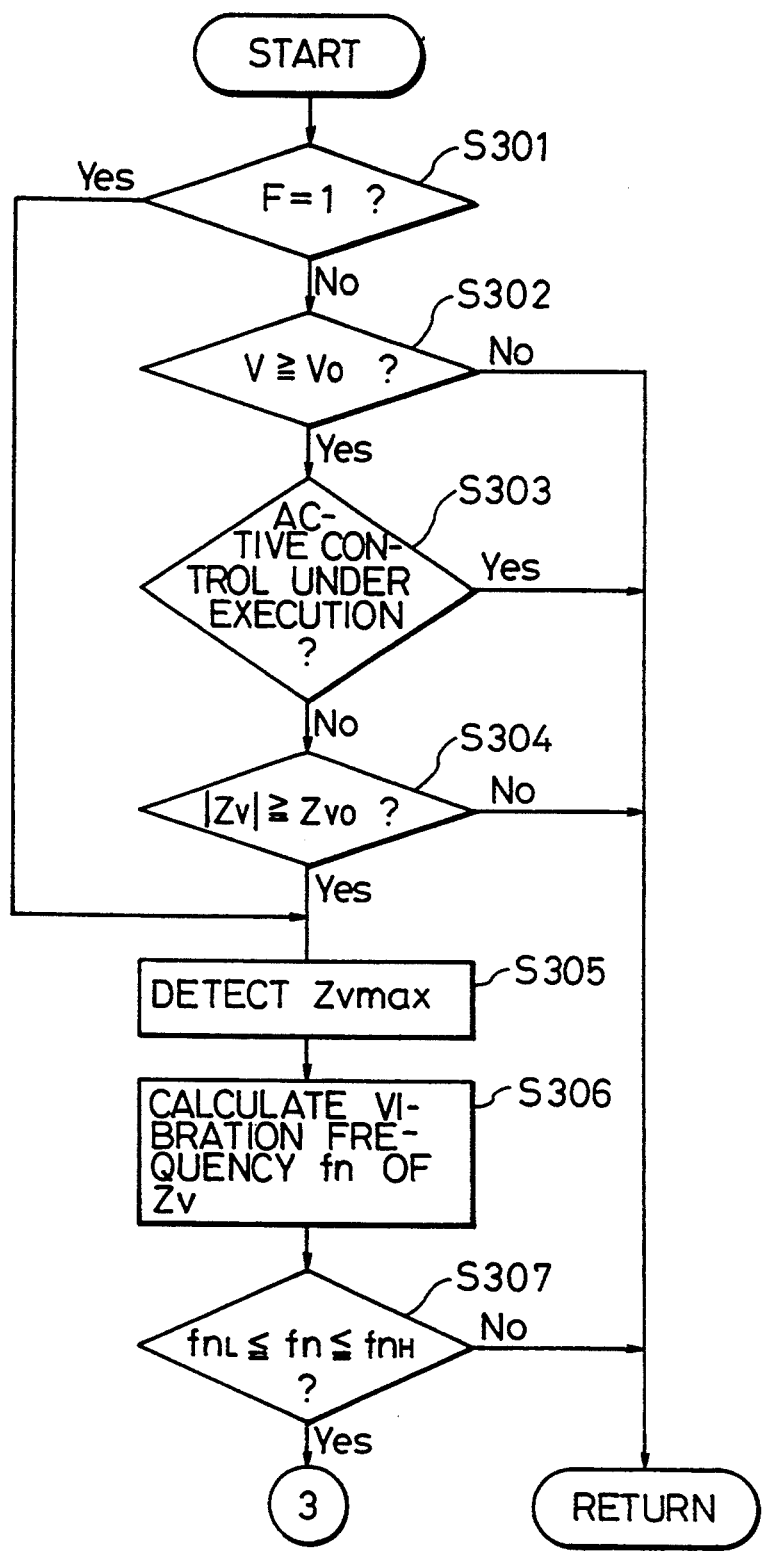
FIG. 13 is a flowchart showing part of a riding quality control procedure according to the method of the third embodiment.
Figure 14:
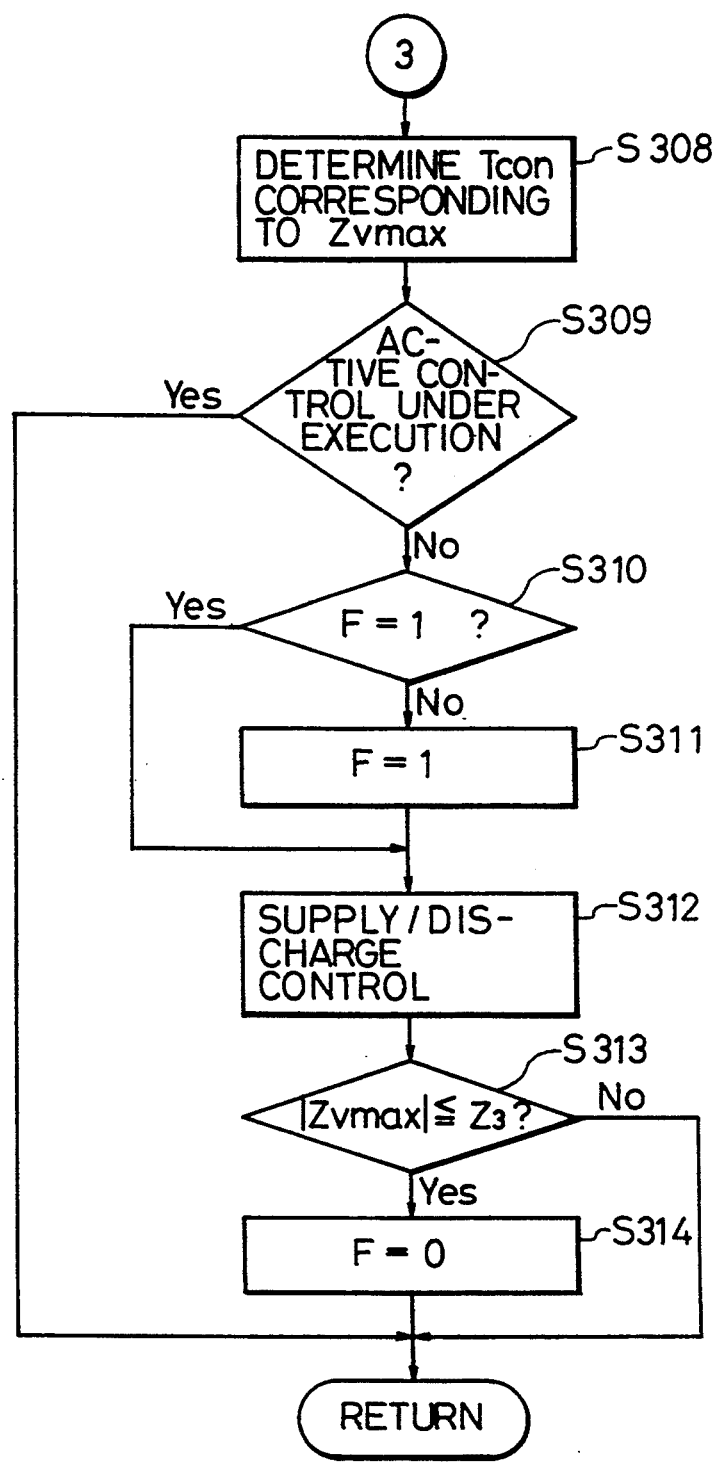
FIG. 14 is a flowchart showing the remaining part of the riding quality control procedure shown in FIG. 13.

As shown in FIGS. 13 and 14, in the riding quality control, the processor 36a successively executes a series of steps corresponding to Steps S1 to S7 of FIG. 2 (Steps S301–S307). If the vehicle speed V is lower than the predetermined vehicle speed V0, or if an active control other than the riding quality control is under execution, or if the absolute value |ZV| of the control information supplied from the velocity information generating section 60 is smaller than a predetermined level ZV0, or if the vibration frequency fn of the control information ZV is outside a predetermined frequency range, the processor 36a ends the present cycle of the riding quality control, without executing a substantial part thereof.

Figure 15:
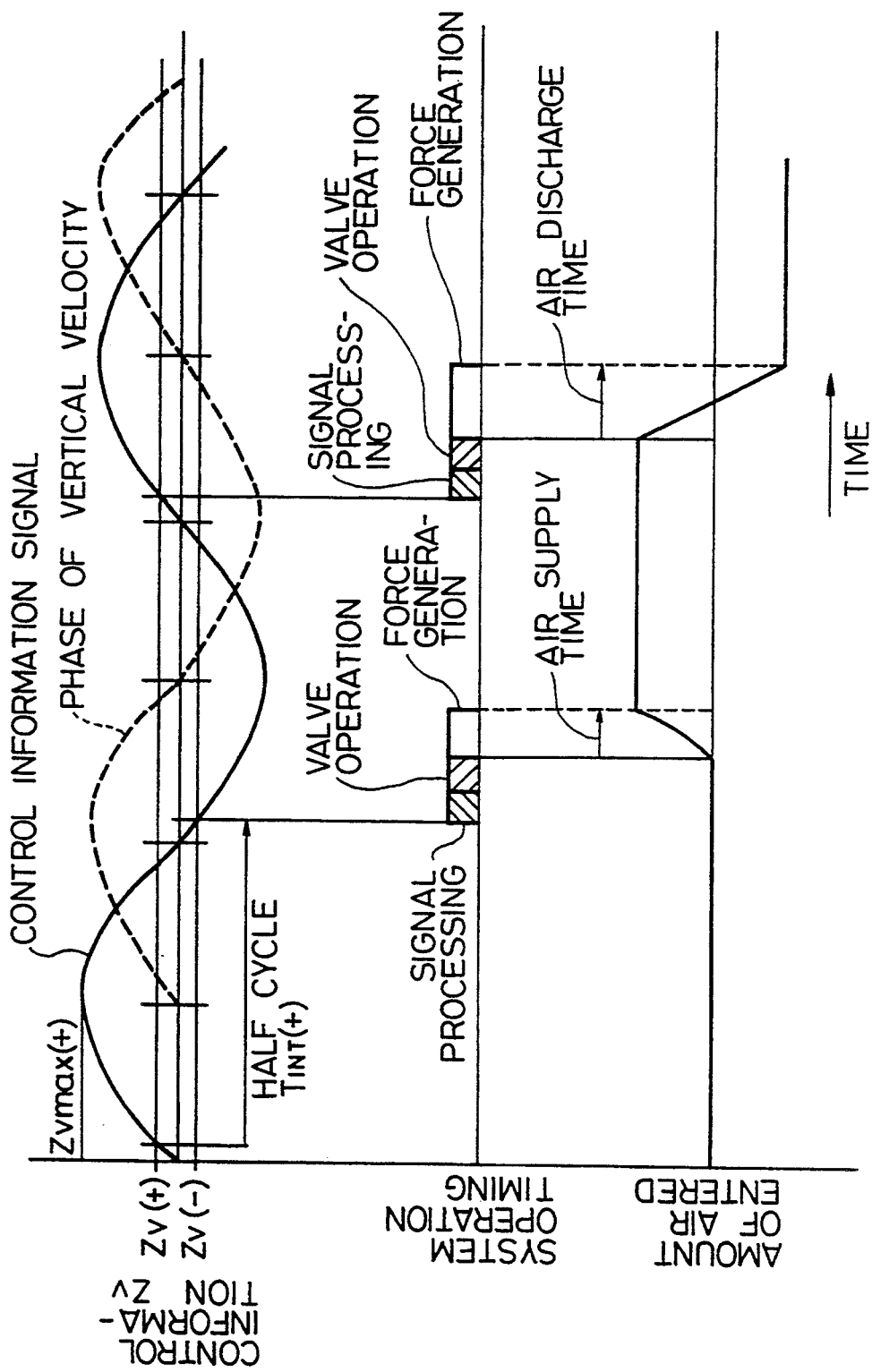
FIG. 15 is a graph illustrating a method of calculating the vibration frequency of control information (relative vertical velocity) ZV in the riding quality control and execution timing for supply/discharge control.

The vibration frequency fn of the control information ZV is detected based on a time TINT(+) or TINT(−) elapsed from the time at which the control information ZV crosses a positive or negative threshold ZV(+) or ZV(−) to the time at which the control information ZV crosses the negative or positive threshold (see FIG. 15).

If conditions (1)–(5) are all fulfilled: (1) the value of the flag F is not "1", (2) the vehicle speed V is higher than or equal to the predetermined speed V0, (3) no active control is under execution, (4) the absolute value |ZV| of the control information is greater than or equal to the predetermined level ZV0, and (5) the vibration frequency fn of the control information ZV is within the predetermined frequency range; or if the value of the flag F is "1", the processor 36a determines a supply/discharge control time Tcon corresponding to the maximum value ZVmax of the control information ZV, referring to a supply/discharge time map stored in the memory 36b of the control unit 36 (Step S308). Preferably, the product of the value Tcon determined in Step S308 and a predetermined value (e.g., 0.7), that is, 0.7 Tcon, is used as the supply/discharge control time Tcon for the first cycle of the supply/discharge control process.

Figure 16:
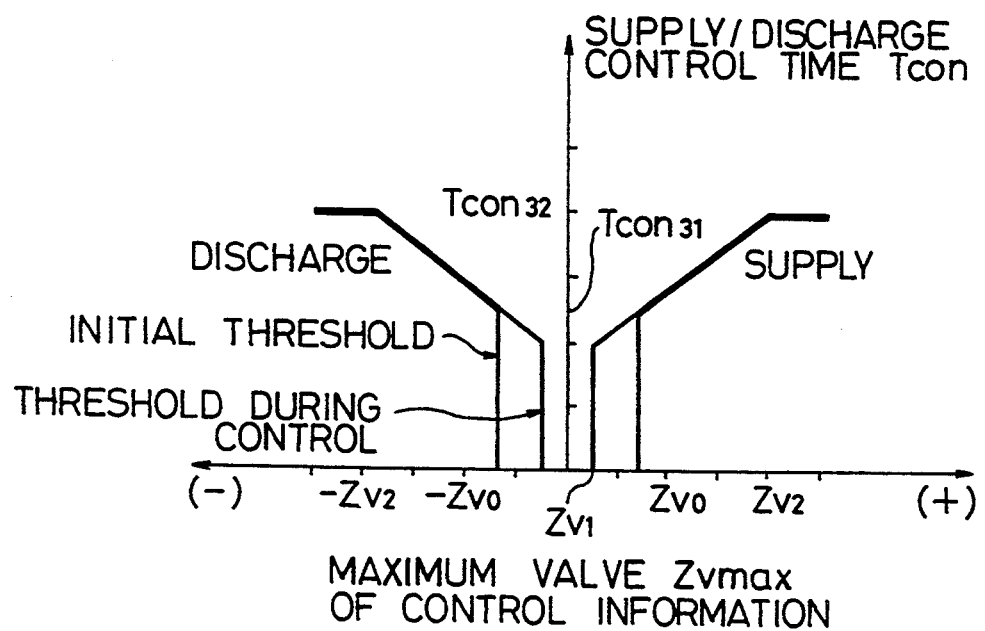
FIG. 16 is a graph showing an example of a supply/discharge time map used for the riding quality control.

As shown in FIG. 16, the supply/discharge time map is set in the same manner as the map shown in FIG. 5. Namely, if the absolute value |ZV| of the control information is equal to a velocity threshold |ZV0| for starting the supply/discharge control, the supply/discharge time Tcon is set to a first predetermined time Tcon31, and if the absolute value |ZV| is greater than or equal to a predetermined value ZV2, the supply/discharge time Tcon is set to a second predetermined time Tcon32. If the absolute value |IZV| falls within the range between the threshold |ZV0| and the predetermined value |ZV2|, the supply/discharge time Tcon is linearly increased from the first predetermined time Tcon31 to the second predetermined time Tcon32 with increase in the absolute value |ZV|. Values ZV1 and −ZV1, which are smaller in absolute value than the thresholds ZV0 and −ZV0 for starting the control, are used as thresholds for determining the supply/discharge time Tcon after the relative vertical velocity ZV has decreased following the start of the supply/discharge control. Consequently, controllability of the riding quality control after the decrease of the control information ZV is ensured.

If it is judged in Step S309 that no active control is under execution, the processor 36a determines whether the value of the flag F is "1" (Step S310). If NO in Step S310, the processor 36a sets the flag F to "1" (Step S311), executes the supply/discharge control process (Step S312), as in the first embodiment, and then determines whether the absolute value |ZVmax| of the maximum value of the control information has become smaller than or equal to a predetermined value ZV3, e.g., 0.02 m/s (Step S313).

Thereafter, Step S308 and the subsequent steps are repeatedly executed until the absolute value |ZVmax| becomes smaller than or equal to the predetermined value ZV3. When the absolute value |ZVmax| has become smaller than or equal to the predetermined value ZV3, the processor 36a resets the flag F to "0" (Step S314), and ends the riding quality control.

As described above, in this embodiment, the need for the supply/discharge control and the supply/discharge time are determined based on the control information ZV, which has a phase close to the phase of the sprung acceleration advanced by 90 degrees with respect to the sprung velocity and which represents the relative vertical velocity between the sprung and unsprung sides, in place of the sprung velocity used in the conventional system. Accordingly, in the pneumatic system which requires a significant length of time from completion of the signal processing, which includes the determination of the need for the supply/discharge control, to actual generation of the force, the start of the supply/discharge control is, according to this embodiment, advanced by a time period corresponding to the operation delay of the pneumatic system, as in the first embodiment. Consequently, the operation delay of the pneumatic system is substantially compensated for, and the force for suppressing the sprung velocity is generated at required timing.

An operation control method for a pneumatic active suspension system, according to a fourth embodiment of the present invention, will be now described.

The method of this embodiment uses a displacement sensor, which is normally installed in motor vehicles to which active control is applied, for carrying out skyhook damper theory-based suspension control, like the third embodiment, and is designed to overcome the difficulty in executing active control properly in accordance with the output of the displacement sensor, which difficulty arises from a reduced sensitivity of the displacement sensor caused by a reduction in the relative vertical displacement between the vehicle body and the wheels due to execution of the active control.

The suspension system associated with this embodiment has a basic arrangement identical with that of the system associated with the third embodiment, and includes the control information generator 60 shown in FIG. 12. Further, the system of this embodiment is characterized in that the supply/discharge control can be carried out properly in accordance with a control pattern which is selected from among a plurality of preset control patterns based on the control information.

Figure 17:
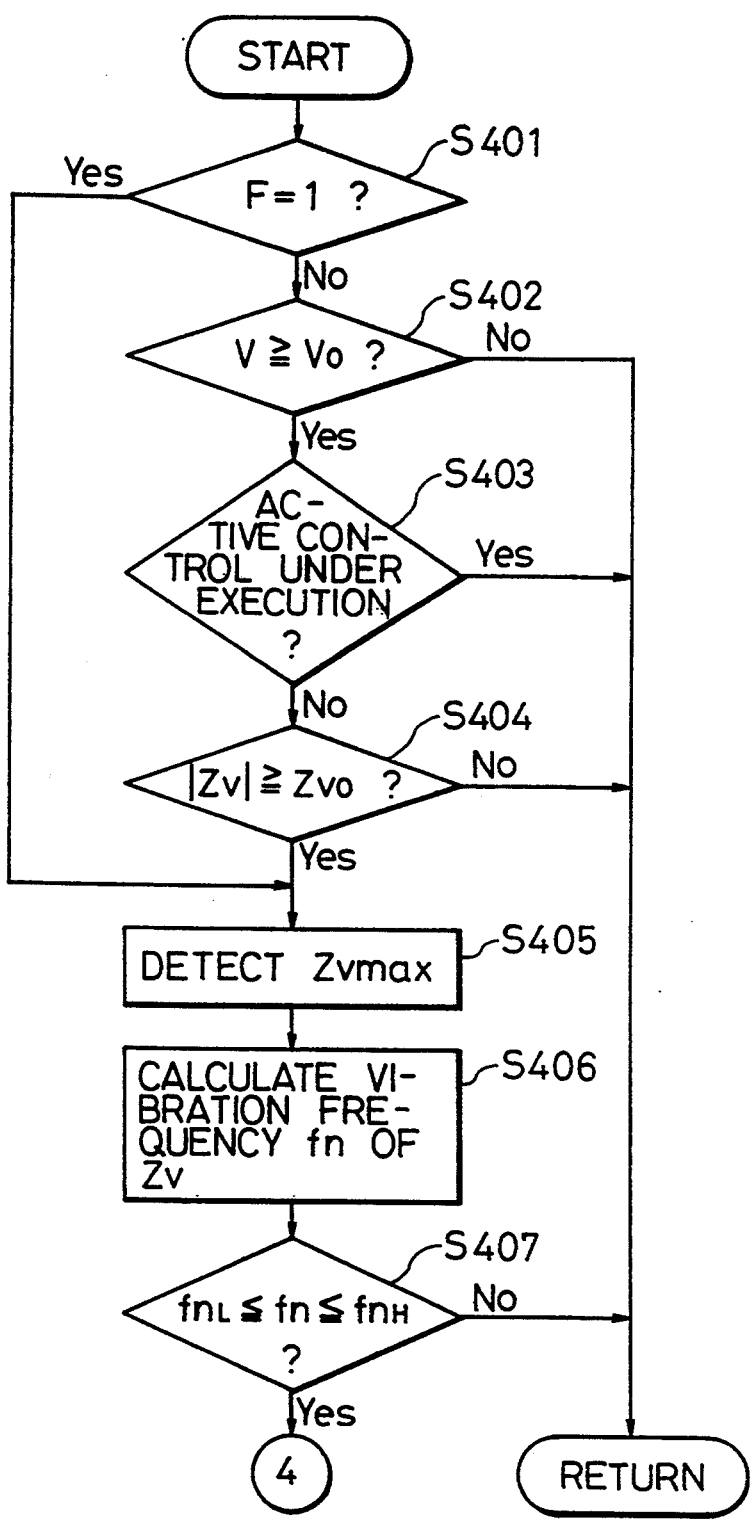
FIG. 17 is a flowchart showing part of a riding quality control procedure for carrying out an operation control method for a pneumatic suspension system according to a fourth embodiment of the present invention.
Figure 18:
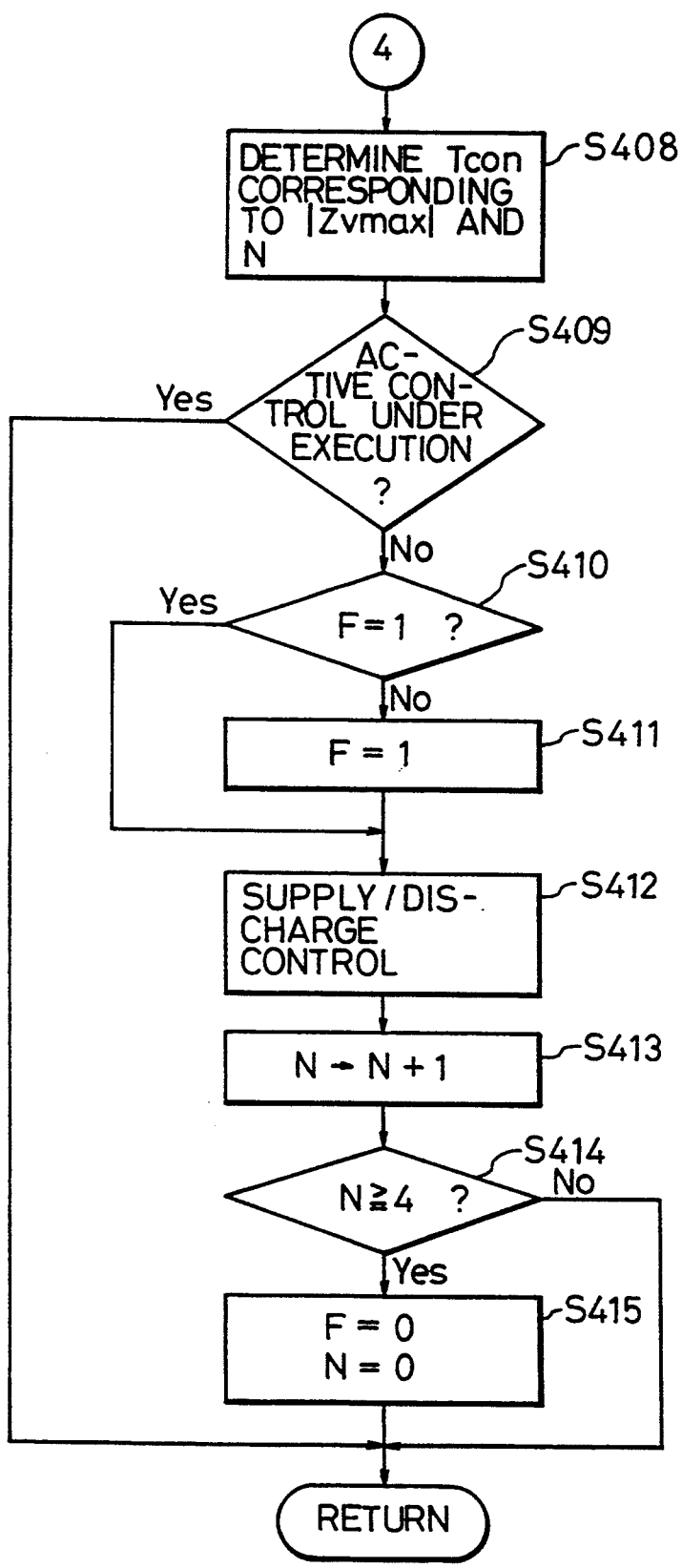
FIG. 18 is a flowchart showing the remaining part of the riding quality control procedure shown in FIG. 17.

The riding quality control of this embodiment will be now described with reference to FIGS. 17 and 18.

In the riding quality control, the processor 36a successively executes a series of steps corresponding to Steps S301 to S307 of FIG. 13 (Steps S401–S407). If conditions (A)–(D) are all fulfilled: (A) the value of the flag F is not "1", (B) the vehicle speed V is higher than or equal to the predetermined speed V0, (C) no active control is under execution, (D) the absolute value $|ZV|$ of the control information is greater than or equal to the predetermined level ZV0, and (E) the vibration frequency fn of the control information ZV is within the predetermined frequency range; or if the value of the flag F is "1", the processor 36a determines a supply/discharge control time Tcon corresponding to the maximum value ZVmax of the control information ZV and a number of times, N, the supply/discharge control has been executed, referring to a supply/discharge time map stored in the memory 36b of the control unit 36 (Step S408).

Figure 19:
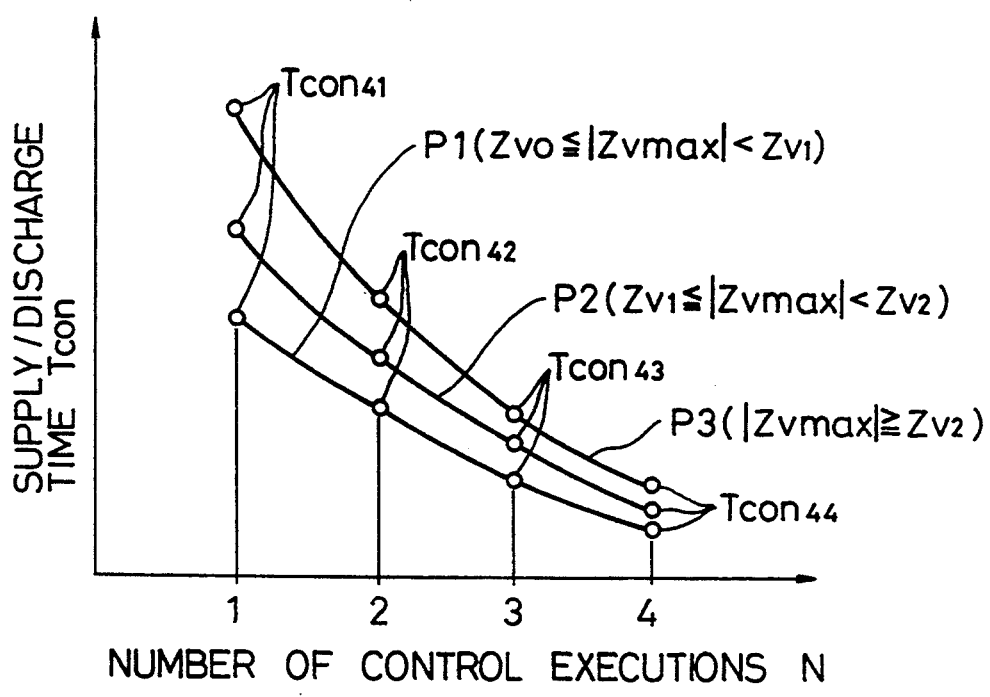
FIG. 19 is a graph showing an example of a supply/discharge time map used for the riding quality control.

The supply/discharge time map is set as shown in FIG. 19. Namely, the supply/discharge time map includes, for example, three control patterns P1, P2 and P3 which respectively correspond to first, second and third speed regions divided according to the absolute value $|Vmax|$ of the maximum value ZVmax of the control information detected in Step S405 and which are each represented by a curve based on the number N of executions of the supply/discharge control and the supply/discharge time Tcon. The first speed region is a region in which the absolute value $|ZVmax|$ is greater than or equal to the aforesaid predetermined level ZV0, e.g., 0.05 m/s, and at the same time smaller than a first predetermined value ZV1, e.g., 0.07 m/s. The second speed region is a region in which the absolute value is greater than or equal to the first predetermined value ZV1 and at the same time smaller than a second predetermined value ZV2, e.g., 0.1 m/s, and the third speed region is a region in which the absolute value is greater than or equal to the second predetermined value ZV2. Each control pattern includes four supply/discharge control times Tcon41 to Tcon44 which are set such that the values thereof become smaller in the order mentioned, and the supply/discharge control is executed four times in total in accordance with each of the control patterns, that is, air supply control and air discharge control are executed alternately, twice each. Speaking generally, the control pattern represents a proper air supply/discharge quantity suited to the damping characteristics of the sprung vertical motion caused by the supply/discharge control; in other words, it represents a proper air supply/discharge quantity corresponding to the time elapsed from the start of the supply/discharge control.

After determining the supply/discharge time Tcon in Step S408, the processor 36a again determines whether an active control is under execution (Step S409), and if no active control is under execution, the processor 36a determines whether the value of the flag F is "1" which indicates that the supply/discharge control of the riding quality control is being executed (Step S410). In the present case, the supply/discharge control is not yet executed and thus the value of the flag F is not "1", and accordingly, the processor 36a sets the flag F to the value "1" (Step S411), and then executes the supply/discharge control (Step S412), as in the first embodiment.

After completing the present cycle of the supply/discharge control process, the processor 36a increments the number N of control executions by "1" (Step S413), and determines whether the incremented number N of executions takes a value greater than or equal to "4" (Step S414). In the present case, the supply/discharge control has just been started and thus the result of the determination in Step S414 becomes NO; therefore, the processor 36a ends the present cycle of riding quality control, without changing the value of the flag F to "0" which indicates termination of the supply/discharge control.

Accordingly, in Step S401 of the subsequent cycle, it is judged that the value of the flag F is "1". Thus, the program proceeds from Step S401 to Step S405, and Step S405 and the subsequent steps are executed again. In this case, since it is judged in Step S410 that the value of the flag F is "1", the program proceeds from Step S410 to Step S412 for the supply/discharge control, without executing Step S411. If it is judged in Step S414 of a later cycle that the number N of control executions has become greater than or equal to "4", that is, if it is judged that a total of four cycles of supply/discharge control has been completed, the processor 36a resets the flag F to "0", which indicates termination of the supply/discharge control, and resets the number N of control executions N to "0" (Step S415), followed by termination of the riding quality control shown in FIGS. 17 and 18.

In this manner, each time a vibration is input from the road surface, a total of, e.g., four cycles, of supply/discharge control is normally executed in such a manner that air supply control and air discharge control are executed alternately, twice each, thereby gradually suppressing the sprung vertical vibration. In each cycle of the supply/discharge control, an amount of air suited to the sprung vertical vibration, which gradually decreases as a result of the supply/discharge control, is supplied to or discharged from the air spring chamber 3 of the suspension unit S. As a result, even if the relative displacement between the sprung and unsprung sides decreases due to execution of the supply/discharge control and the sensitivity of the displacement sensor 61 lowers, the supply/discharge control is continuously and forcibly executed in accordance with the control pattern. Namely, the supply or discharge of a proper amount of air suited to the time elapsed from the start of the supply/discharge control is periodically carried out. During a travel on an express highway or the like, continuous vibration input from the road surface rarely occurs. Normally, therefore, almost every sprung vertical vibration can be suppressed by the supply/discharge control, in which amounts of air to be supplied or discharged at the time of vibration input and in the subsequent control cycles are predetermined in accordance with the control pattern selected at the time of vibration input.

The present invention is not limited to the first to fourth embodiments described above, and various modifications can be made.

For example, in the second embodiment is described the pneumatic active suspension for suppressing the sprung vertical velocity by the supply/discharge control which uses the sprung vertical acceleration detected by the vertical acceleration sensor 51 as control information, but the present invention can be applied to various types of suspensions wherein the sprung vertical motion (vertical position, vertical velocity, vertical acceleration) is suppressed by carrying out the supply/discharge control on the front- and rear-wheel actuators. Generally speaking, the supply/discharge control of the present invention is carried out based on a sprung vertical motion-related parameter (vertical position, velocity or acceleration) detected by a single sensor arranged at the sprung side near the front wheels. Specifically, in the case of a hydraulic system having a smaller operation delay than a pneumatic system, for example, the supply/discharge control is executed using the sprung vertical acceleration detected by the vertical acceleration sensor 51, or the sprung vertical velocity obtained by integrating the sprung vertical acceleration, as control information, so that the sprung vertical acceleration or the sprung vertical velocity is reduced.

In the third and fourth embodiments, the pneumatic active suspension for suppressing the sprung vertical velocity is described, but the present invention can be applied to various types of suspensions including a hydraulic suspension wherein the sprung vertical motion (vertical position, vertical velocity, vertical acceleration) is suppressed by performing supply/discharge control on the actuators. In the case where the present invention is applied to a hydraulic suspension having excellent operation response, the control information generating section 60 may be modified; for example, the differentiating circuit 63 can be omitted.

Although, in the third and fourth embodiments, the vehicle height sensor 34 is used as the displacement sensor 61, a stroke sensor or the like arranged separately from the vehicle sensor 34 may alternatively be used.

In the riding quality control according to the third and fourth embodiments, the supply/discharge control of the actuators (air spring chambers 3 of the suspension units S) associated with the respective wheels is carried out based on the velocity information supplied from the velocity information generating sections provided for the respective wheels. Alternatively, two velocity information generating sections may be provided corresponding to two displacement sensors arranged at the front- and rear-wheel sides, respectively, so that the supply/discharge control of the two actuators associated with each pair of the front and rear wheels may be integrated and executed in accordance with the velocity information supplied from a single velocity information generating section common to the two actuators concerned. In this case, the cost of sensor equipment can be further reduced.

Furthermore, in the fourth embodiment, the supply/discharge control is executed four times in total each time vibration is input, but the number of executions of the supply/discharge control is not limited to four and the supply/discharge control may be executed twice in total, for example.

The present invention has the following advantages:
(i) In the case where the present invention is applied to a fluid active suspension using a compressible fluid as the operating medium, the sprung vertical acceleration is detected, and the supply and discharge of the compressible fluid to and from the suspension is controlled based on the detected acceleration such that the sprung vertical velocity is canceled out. Accordingly, the sprung vertical motion can be suppressed because the operation delay of the fluid active suspension is compensated for, and the cost of the apparatus can be reduced.
(ii) The supply/discharge control is executed when the detected acceleration is close to the sprung resonance frequency, and thus the wafting phenomenon can be prevented.
(iii) In the case where the present invention is applied to a pneumatic suspension using air as the operating medium, the arrangement of the apparatus is simplified and the cost is reduced.
(iv) Where the present invention is used with an active suspension operation method wherein a force serving to suppress the sprung vertical motion of the front- and rear-wheel sides is produced by supplying and discharging the operating medium to and from the front- and rear-wheel actuators, the supply/discharge control for the front-wheel actuators is carried out based on the output of a single sensor, which is arranged at the sprung side near the front wheels for detecting a sprung vertical motion-related parameter, and the supply/discharge control for the rear-wheel actuators is carried after a delay time corresponding to the vehicle speed has elapsed from the start of the supply/discharge control of the front-wheel actuators. Thus, it is unnecessary to provide a plurality of sensors, whereby the cost of the apparatus can be reduced.
(v) In the case where the method of the present invention is applied to an active suspension using a compressible fluid as the operating medium, the supply/discharge control for the front- and rear-wheel actuators is carried out based on the sprung vertical acceleration of the front-wheel side detected by a single vertical acceleration sensor, whereby operation delay of the suspension can be compensated for and the sprung vertical vibration can be reliably suppressed.
(vi) Where the present invention is used with a control information generator for an active suspension wherein the supply and discharge of the operating fluid to and from the actuators are controlled to suppress the sprung vertical motion, the control information generator comprises a displacement sensor for detecting the relative displacement between the sprung and unsprung sides, phase adjusting means, and relative displacement velocity calculating means for calculating the relative displacement velocity based on the output of the displacement sensor. One of the phase adjusting means and the relative displacement velocity calculating means has an input side thereof connected to the displacement sensor and an output side thereof connected to the other of the two means, so as to generate control information having a phase close to the phase of the sprung vertical acceleration and corresponding to the relative displacement velocity between the sprung and unsprung sides. Thus, it is possible to generate control information for use in active control for suppressing the sprung vertical motion, without using a specialized sensor.

The control information faithfully reflects change in the relative displacement between the sprung and unsprung sides. Accordingly, even if the output of the displacement sensor has dependence on the direction of the relative displacement between the sprung and unsprung sides due to, e.g., friction of a mechanism near the displacement sensor, the control information is free from such directional dependence and can be suitably used for the control.
(vii) Where the supply/discharge control is executed when the frequency of the control information (relative vertical velocity) is within the sprung resonance frequency range, the frequency range of vibration to be detected can be narrowed, whereby a filter circuit (phase adjusting means) having both the phase adjusting function and the filtering function can be easily achieved.

(viii) In the case where the present invention is used with an active suspension operation method wherein the supply and discharge of the operating medium to and from the actuators are controlled so as to suppress the sprung vertical motion, a plurality of control patterns are preset which each represent a supply/discharge amount of the operating medium matched with the damping characteristics of the sprung vertical motion according to the supply/discharge control, control information is generated based on the output of a displacement sensor for detecting the relative displacement between the sprung and unsprung sides, and the supply/discharge control is executed in accordance with one of the control patterns selected based on the control information. Thus, it is possible to properly carry out active control for suppressing the sprung vertical motion, in accordance with the control information generated based on the output of the displacement sensor.

What is claimed is:

1. A method of controlling operation of a fluid active suspension apparatus whose suspending characteristic is actively changed in accordance with supply and discharge of an operating fluid to and from a fluid actuator, comprising the steps of:
   (a) presetting a plurality of supply/discharge control patterns;
   (b) detecting a parameter related to a sprung vertical motion;
   (c) selecting a required supply/discharge control pattern from among said plurality of supply/discharge control patterns in accordance with the magnitude of the detected sprung vertical motion-related parameter; and
   (d) carrying out supply/discharge control of a compressible fluid as said operating fluid, in accordance with the selected supply/discharge control pattern.

2. The method according to claim 1, wherein said sprung vertical motion-related parameter comprises a sprung vertical acceleration detected by a sprung vertical acceleration sensor arranged at a sprung side.

3. The method according to claim 1, wherein said sprung vertical motion-related parameter comprises control information having a phase close to that of a sprung vertical acceleration, said control information being obtained by performing a phase compensation process on a relative displacement velocity between sprung and unsprung sides which is obtained based on a relative displacement between the sprung and unsprung sides detected by a stroke sensor arranged between the sprung and unsprung sides.

4. The method according to claim 1, wherein said supply/discharge control of the compressible fluid is executed only when the frequency of the sprung vertical motion-related parameter falls within a predetermined frequency range including the resonance frequency of the sprung side.

5. The method according to claim 4, wherein said supply/discharge control is started when the magnitude of the sprung vertical motion-related parameter has become greater than or equal to a first predetermined value, and is ended when the magnitude of the sprung vertical motion-related parameter has become smaller than a second predetermined value smaller than the first predetermined value after the start of the supply/discharge control.

6. A method of controlling operation of a fluid active suspension apparatus whose suspending characteristic is actively changed in accordance with supply and discharge of an operating fluid to and from a fluid actuator, comprising the steps of:
   (a) detecting a sprung vertical acceleration; and
   (b) carrying out supply/discharge control of a compressible in a fluid actuator as said operating fluid, in accordance with the detected sprung vertical acceleration, so that a sprung vertical velocity is canceled out by a change in pressure of the compressible fluid in the fluid actuator.

7. The method according to claim 6, wherein said supply/discharge control of the compressible fluid is executed only when the frequency of the sprung vertical acceleration falls within a predetermined frequency range including a sprung resonance frequency.

8. The method according to claim 7, wherein said supply/discharge control is started when the magnitude of the sprung vertical acceleration has become greater than or equal to a first predetermined value, and is ended when the magnitude of the sprung vertical acceleration has become smaller than a second predetermined value smaller than the first predetermined value after the start of the supply/discharge control.

9. A method of controlling operation of a fluid active suspension apparatus whose suspending characteristic is actively changed in accordance with supply and discharge of an operating fluid to and from a fluid actuator, comprising the steps of:
   (a) detecting a relative displacement between sprung and unsprung sides;
   (b) obtaining a relative displacement velocity between the sprung and unsprung sides based on the detected relative displacement;
   (c) generating control information having a phase close to that of a sprung vertical acceleration, by subjecting the relative displacement velocity to a phase compensation process; and
   (d) carrying out supply/discharge control of a compressible fluid as said operating fluid, in accordance with the control information.

10. The method according to claim 9, wherein the phase of the relative displacement velocity is delayed by a predetermined phase angle in said phase compensation process.

11. The method according to claim 9, wherein the phase of the relative displacement velocity is advanced by a predetermined phase angle in said phase compensation process.

12. The method according to claim 9, wherein said supply/discharge control of the compressible fluid is executed only when the frequency of the control information falls within a predetermined frequency range including a sprung resonance frequency.

13. The method according to claim 12, wherein said supply/discharge control is started when the magnitude of the control information has become greater than or equal to a first predetermined value, and is ended when the magnitude of the control information has become smaller than a second predetermined value smaller than the first predetermined value after the start of the supply/discharge control.

14. The method according to any one of claims 1, 6 and 9, which is applied to a fluid active suspension apparatus having fluid actuators arranged at front- and rear-wheel sides, respectively, and which further comprises the step of detecting a vehicle speed, wherein the supply/discharge control of the compressible fluid with respect to the fluid actuators of the rear-wheel side is started when a delay time corresponding to the vehicle speed has elapsed from the start of the supply/discharge control of the compressible fluid with respect to the fluid actuators of the front-wheel side.

15. The method according to any one of claims 1, 6 and 9, wherein said compressible fluid comprises air.

16. A method of controlling operation of a fluid active suspension apparatus whose suspending characteristic is actively changed in accordance with supply and discharge of an operating fluid to and from a fluid actuator, comprising the steps of:
 presetting a plurality of supply/discharge control patterns;
 detecting a parameter related to a sprung vertical motion;
 measuring a number of times supply/discharge control has been executed;
 selecting a required supply/discharge control pattern from among the supply/discharge control patterns in accordance with the magnitude of the detected sprung vertical motion-related parameter and the measured number of times supply/discharge control has been executed; and
 carrying out supply/discharge control of a compressible fluid as the operating fluid, in accordance with the selected supply/discharge control pattern.

17. A fluid active suspension apparatus comprising:
 fluid actuators arranged between sprung and unsprung sides of a vehicle and associated with front- and rear-wheel sides of the vehicle, respectively;
 a supply source for supplying a compressible fluid;
 a supply valve arranged in a supply pipe connecting the fluid actuators and the supply source;
 a discharge valve arranged in a discharge pipe connected to the fluid actuators;
 detecting means for detecting a sprung vertical motion-related parameter and generating an output representing the detected parameter; and
 control means including memory means storing a plurality of supply/discharge control patterns, the control means selecting a pattern suited to the output of the detecting means, from among said plurality of supply/discharge control patterns, and controlling open/close operation of the supply valve and the discharge valve in accordance with the selected supply/discharge control pattern, to thereby control supply and discharge of the compressible fluid to and from the fluid actuators.

18. The fluid active suspension apparatus according to claim 17, wherein said control means further includes determination means for determining the frequency of the sprung vertical motion-related parameter, and carries out the supply/discharge control of the compressible fluid only when the frequency of the sprung vertical motion-related parameter falls within a predetermined frequency range including a sprung resonance frequency.

19. The fluid active suspension apparatus according to claim 18, wherein said control means further includes second determination means for determining the magnitude of the sprung vertical motion-related parameter, the control means starting the supply/discharge control when the magnitude of the sprung vertical motion-related parameter has become greater than or equal to a first predetermined parameter, and ending the supply/discharge control when the magnitude of the sprung vertical motion-related parameter has become smaller than a second predetermined value smaller than the first predetermined value after the start of the supply/discharge control.

20. The fluid active suspension apparatus according to claim 17, which further comprises a vehicle speed sensor for detecting a vehicle speed, and wherein said detecting means includes a single sensor arranged at a front of a vehicle body which is part of the sprung side, and said control means further includes means for obtaining a delay time corresponding to the vehicle speed detected by the vehicle speed sensor, the supply/discharge control of the compressible fluid with respect to the fluid actuators of the rear-wheel side being started when the delay time has elapsed from the start of the supply/discharge control of the compressible fluid with respect to the fluid actuators of the front-wheel side.

21. A fluid active suspension apparatus comprising:
 a fluid actuator arranged between sprung and unsprung sides of a vehicle;
 a supply source for supplying a compressible fluid;
 a supply valve arranged in a supply pipe connecting the fluid actuator and the supply source;
 a discharge valve arranged in a discharge pipe connected to the fluid actuator;
 detecting means for detecting a sprung vertical acceleration and generating an output representing the detected sprung vertical acceleration; and
 control means for controlling open/close operation of the supply valve and the discharge valve, at timing such that a sprung vertical velocity is canceled out by a change in pressure of the compressible fluid in the fluid actuator, in accordance with the output of the detecting means, to thereby control supply and discharge of the compressible fluid to and from the fluid actuator.

* * * * *